US012288482B2

(12) United States Patent
Mos et al.

(10) Patent No.: US 12,288,482 B2
(45) Date of Patent: Apr. 29, 2025

(54) RETRACTABLE LIGHTING FIXTURE

(71) Applicant: SIGNIFY HOLDING B.V., Eindhoven (NL)

(72) Inventors: Barry Mos, Bocholt (BE); Peter Johannes Martinus Bukkems, Deurne (NL); Bartel Marinus Van De Sluis, Eindhoven (NL); Martinus Hermanus Wilhelmus Maria Van Delden, Venlo (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 114 days.

(21) Appl. No.: 18/271,448

(22) PCT Filed: Jan. 6, 2022

(86) PCT No.: PCT/EP2022/050199
§ 371 (c)(1),
(2) Date: Jul. 8, 2023

(87) PCT Pub. No.: WO2022/148807
PCT Pub. Date: Jul. 14, 2022

(65) Prior Publication Data

US 2024/0062687 A1 Feb. 22, 2024

(30) Foreign Application Priority Data

Jan. 11, 2021 (EP) .................................... 21150824

(51) Int. Cl.
*G09F 13/04* (2006.01)
*G09F 11/08* (2006.01)

(52) U.S. Cl.
CPC .......... *G09F 13/0463* (2021.05); *G09F 11/08* (2013.01); *G09F 13/0409* (2013.01); *G09F 13/0413* (2013.01); *G09F 13/0468* (2021.05)

(58) Field of Classification Search
CPC ............. G09F 13/0463; G09F 13/0468; G09F 13/0409; G09F 13/0413; G09F 11/08
See application file for complete search history.

(56) References Cited

U.S. PATENT DOCUMENTS 6,505,956 B1 1/2003 Priddy et al.
9,803,843 B2 10/2017 Engelen et al.
(Continued)

FOREIGN PATENT DOCUMENTS

| | | | |
|---|---|---|---|
| CN | 1388506 | A | 1/2003 |
| EP | 2986897 | A1 | 2/2016 |
| WO | 2014155237 | A1 | 10/2014 |

*Primary Examiner* — Anne M Hines

(57) ABSTRACT

The invention relates to a retractable lighting fixture, comprising an elongated drum rotatable over a length axis; and a flexible multilayer lighting sheet movable between a retracted position and a protracted position, with the multilayer lighting sheet in the retracted position being at least partially retracted in one or more windings around the drum and with the multilayer lighting sheet in the protracted position being fully unwound from the drum; the multilayer lighting sheet being composed of at least one LED layer and at least one diffusing optical layer, the at least one LED layer having a first LED layer edge mounted at a first mounting position of the drum and the at least one diffusing optical layer having a first optical layer edge mounted at a second mounting position of the drum, the first mounting position being located at an arc length from the second mounting position.

15 Claims, 16 Drawing Sheets

(56) References Cited

U.S. PATENT DOCUMENTS

| | | | | |
|---|---|---|---|---|
| 10,455,710 | B2 * | 10/2019 | Kim | G02F 1/133305 |
| 10,830,421 | B2 | 11/2020 | Vasylyev | |
| 2014/0254157 | A1 * | 9/2014 | Engelen | E06B 9/24<br>362/249.03 |
| 2016/0003459 | A1 | 1/2016 | Sweegers et al. | |
| 2016/0135284 | A1 | 5/2016 | Choi et al. | |
| 2020/0302833 | A1 * | 9/2020 | Kay | G09F 9/301 |

* cited by examiner

RETRACTABLE LIGHTING FIXTURE

CROSS-REFERENCE TO PRIOR APPLICATIONS

This application is the U.S. National Phase application under 35 U.S.C. § 371 of International Application No. PCT/EP2022/050199, filed on Jan. 6, 2022, which claims the benefit of European Patent Application No. 21150824.7, filed on Jan. 11, 2021. These applications are hereby incorporated by reference herein.

TECHNICAL FIELD

The invention relates to a retractable lighting fixture, also known as a poster like display box, which are used at events or for promotions in retail environments.

BACKGROUND OF THE INVENTION

Retractable lighting fixtures or poster like display boxes implement a flexible multilayer lighting sheet foil which can be rolled up on a roll or drum for transport or storage. Such poster like display boxes are used at events, such as conventions, or for promotions in retail environments, such as shops, galleries, showrooms, and the like. When unrolled, the flexible multilayer lighting sheet foil presents a display for illumination or advertisement/information purposes.

An example of such retractable lighting fixture or poster like display box is disclosed in US-B2-9803843, in which the flexible multilayer lighting sheet foil is composed of a LED layer and an information containing optical layer. Both layers forming the flexible multilayer lighting sheet foil are rolled on a drum. When unrolled, a specific spacer mechanism connected with the layers, is activated, causing both layers to be spaced apart for a proper, effective illumination of the information containing optical layer using the LED layer.

This makes the construction of US-B2-9803843 unnecessarily complex and expensive. In addition, the retractable lighting fixture of US-B2-9803843 does not facilitate an (easy) exchange of the optical layer, which is essential for a poster backlighting solution. It is an object of the disclosure to provide a retractable lighting fixture having a simplified construction allowing a proper, effective illumination of the information containing optical layer using the LED layer as well as exchange of the optical layer.

SUMMARY OF THE INVENTION

According to a first aspect of the disclosure a retractable lighting fixture is proposed, comprising a rotatable drum; and a flexible multilayer lighting sheet movable between a retracted position and an extended position more than the retracted position, with the multilayer lighting sheet in the retracted position being at least partially retracted in one or more windings around the rotatable drum and with the multilayer lighting sheet in the protracted position being fully unwound from the rotatable drum; with the multilayer lighting sheet being composed of at least one LED layer and at least one diffusing optical layer, the at least one LED layer having a first LED layer edge mounted at a first mounting position at the outer circumference of the rotatable drum and the at least one diffusing optical layer having a first optical layer edge mounted at a second mounting position at the outer circumference of the rotatable drum, the first mounting position being located at an arc length along the circumference from the second mounting position.

With the at least one LED layer and the at least one diffusing optical layer being mounted at different mounting positions at the outer circumference of the drum, the layers will be automatically spaced apart from each other, when fully unwound and protracted from the drum. No additional spacer mechanism is required and due to the spacing thus created a correct and effective illumination of the information containing optical layer by means of the LED layer is achieved.

In an example the arc length between the first mounting position and the second mounting position may range between 45°-315°, in particular between 90°-270°. Herewith specific spacing distances, equal to the chord of the respective arc length, between the layers can be achieved in the fully unwound or unrolled, protracted orientation, thus achieving a desired illuminance of the optical layer and hence an optimal visualization and presentation of the information contained thereon.

In an advantageous example, the first mounting position and the second mounting position are located at opposite sides of the rotatable drum, thus achieving a spacing between the layers in the fully unwound or unrolled, protracted orientation equal to the diameter of the drum.

In a further example according to the disclosure the drum comprises at least one further mounting position different from the first mounting position and the second mounting position. Herewith the at least one LED layer and the at least one optical layer can be mounted to the drum at several different mounting positions, allowing an easy exchange of one of the layers, but also to select the correct spacing defined by the chord corresponding with the arc length between the mounting positions of the at least one LED layer and the at least one optical layer, respectively. The possibility to select the correct (chord) spacing between the layers allows for a simple adjustment or selection of the proper, desired illuminance of the at least one optical layer using the LED layer.

Preferably, the mounting positions are located at equidistant arc lengths from each other, for example at equidistant arc lengths of 45°, 90° or 120°, thus effectively presenting a retractable lighting fixture with a rotatable multi-spacing drum, allowing the multilayer lighting sheet to be set up in the fully unwound or unrolled, protracted orientation with a spacing which can be selected in advance by mounting the at least one LED layer and the at least one optical layer in positions distanced by a pre-selected arc length.

In an improvement of the disclosure, each first, second and further mounting position are configured as a first, second and further groove respectively, each groove provided in the outer circumference of the drum and structured to accommodate one of the first LED layer edge and the first optical layer edge, respectively. This allows the LED and optical layers to be easily inserted and secured to the rotatable drum.

Preferably, the grooves extend in the longitudinal direction of the drum, thus allowing a proper accommodating of the free layer edge of each LED layer and optical layer in their respective groove. Also, with the grooves present in the outer circumference of the rotatable drum and the free edges of the layer mounted therein an improved rolling up and down of multilayer lighting sheet is achieved without the risk of folds, greases, wrinkles or damages to both layers.

In a further advantageous example the multilayer lighting sheet is composed of one LED layer and two diffusing optical layers, and wherein the mounting positions of the two diffusing optical layers are located at either side of the mounting position of the LED layer. In this example, with the multilayer lighting sheet fully unwound and protracted from the housing, the LED layer is sandwiched between the two optical layers, which are unwound at either side of the LED layer. With this example, it is possible to display and illuminate two diffusing optical layers simultaneously with one LED layer.

In yet a further example the retractable lighting fixture comprises at least one driver accommodated in the drum arranged for receiving a supply power and for driving the LED layer based on said received supply power.

In a particular example according to the disclosure, the at least one diffusing optical layer is provided at the first optical layer edge with an identification characteristic and a sensing element is provided near at least one of the first, second or further positions, the sensing element structured to sense the identification characteristic of the at least one diffusing optical layer, when mounted at either first, second or further positions.

The identification characteristic provided at the first optical layer edge can be a barcode (QR-code), a punch pattern, or a RFID tag, and can be sensed or detected by the sensing element mounted at one of the positions at the rotatable drum. As in a particular example, the sensing element is structured to control the driver in response to the identification characteristic of the at least one diffusing optical layer being sensed. Thus, an adaptive lighting fixture is presented, capable of adapting the light output of the LED layer and thus adapt the illuminance of the optical layer.

Preferably, the sensing element is accommodated in one of the grooves allowing a proper sensing of the identification characteristic once the free layer edge of the at least one optical layer is mounted in the corresponding groove.

Preferably, in an example according to the disclosure, the at least one diffusing optical layer is made from an at least partially light transmissive material.

In a further example, the layer surfaces of the LED layer and the at least one diffusing optical layer facing each other are structured to reflect visible light. Herewith light being emitted by the LED layer towards the optical layer and which is in part reflected back to the LED layer, is reflected back to the optical layer. This light recycling process improves the overall illuminance of the optical layer and decreases light spots on the optical layer.

In a detail of the above example, the layer surfaces of the LED layer and the at least one diffusing optical layer facing each other are provided with a reflective film.

In yet another advantageous example according to the disclosure, a second LED layer edge of the LED layer and a second optical layer edge of the diffusing optical layer are provided with one or more weight elements. Herewith an effective full unrolling of the multilayer lighting sheet is guaranteed and also stability is provided in for windy outdoor conditions.

The retractable lighting fixture may further comprise light shielding means structured to shield light emitted by the LED layer from exiting or leaking the multilayer lighting sheet along its longitudinal side edges from the space or gap between both the LED layer and the optical layer.

In an example the light shielding means are retractable mounted to the rotatable drum, or the light shielding means are mounted to and extend along the longitudinal side edges of the LED layer. In either example, light emitted by the LED layer is prevented from escaping the multilayer lighting sheet along its both longitudinal side edges. With the gap or space between both layers being closed, no disturbing direct light from the LEDs on the LED layer can be seen, and also the optical efficiency is increased, as well as the light uniformity.

According to a second aspect of the disclosure, a retractable lighting fixture is proposed, comprising a housing; an elongated drum rotatable over a length axis and accommodated in the housing; and a flexible LED layer sheet movable between a retracted position and a protracted position more than the retracted position, with the flexible LED layer sheet in the retracted position being at least partially retracted in one or more windings around the drum and with the flexible LED layer sheet in the protracted position being unwound from the drum and protracted via an exit position from the housing; and at least one diffusing optical layer having a first optical layer edge mounted at a first mounting position of the housing, the first mounting position being different from the exit position.

This example of a retractable lighting fixture allows to unwound the flexible LED layer sheet in its protracted position at any desired length dimension. Herewith the flexible LED layer sheet can be adapted to fit to the length of the optical layer, thus obtaining the optimal illumination of the information contained on the optical layer.

In a further example, the exit position is configured as an exit opening extending along the length axis of the housing, in particular configured as a slit-like exit opening.

Alternatively, the inventive retractable lighting fixture can be expressed as:

- a retractable lighting fixture, comprising an elongated drum rotatable over a length axis and an LED layer sheet and a diffusing optical layer both carried by the drum,
- wherein the diffusing optical layer is movable between a retracted position and a protracted position more than the retracted position, with the diffusing optical layer in the retracted position being at least partially retracted in one or more windings around the drum and with the diffusing optical layer in the protracted position being fully unwound from the drum, and
- wherein either the LED layer sheet is mounted with a first LED layer sheet edge thereof at a first mounting position on an outer surface of the drum and the diffusing optical layer is mounted with a first optical layer edge thereof at a second mounting position on the outer surface of the drum, the first mounting position being located at an arc length from the second mounting position, or
- wherein the LED layer sheet is accommodated inside the drum and is movable between a retracted position and a protracted position more than the retracted position, with the LED layer sheet in the retracted position being at least partially retracted inside the drum in one or more windings around a carrier extending along the length axis inside the drum and with the LED layer sheet in the protracted position being unwound from the carrier and protracted via an exit position from the drum; and the diffusing optical layer is mounted with a first optical layer edge thereof at a first mounting position on an outer surface of the drum, the first mounting position being different from the exit position, the carrier inside the drum and the drum being mutually rotatable.

The drum when accommodating the carrier, then can be considered as a housing, wherein the carrier inside the drum then is considered as being a drum.

BRIEF DESCRIPTION OF THE DRAWINGS

The invention will now be discussed with reference to the drawings, which show in.

DETAILED DESCRIPTION OF THE DRAWINGS

Figure 1:
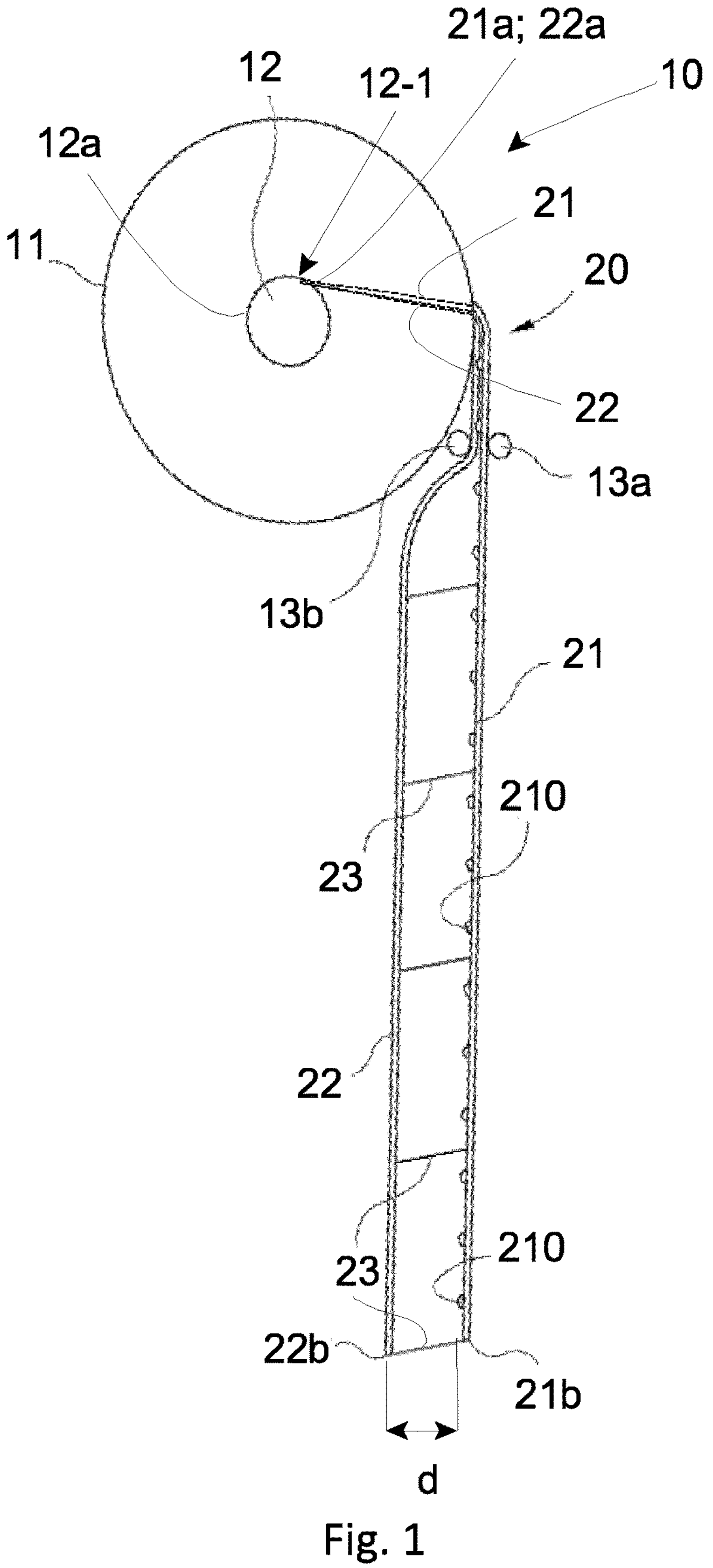
Fig. 1 (PRIOR ART)
FIG. 1 an example of a retractable lighting fixture according to the state of the art.

For a proper understanding of the invention, in the detailed description below corresponding elements or parts of the invention will be denoted with identical reference numerals in the drawings.

FIG. 1, which is denoted with PRIOR ART, describes a known example of a retractable lighting fixture or poster like display box, denoted with reference numeral 10. The retractable lighting fixture 10 includes a housing 11 and a flexible multilayer lighting sheet retractably retainable within the housing 11. The multilayer lighting sheet 20 includes a LED layer 21 and an optical layer 22 abutting or laying over the LED layer 21, when accommodated inside the housing 11.

The LED layer 21 includes a plurality of LEDs 210 thereon and may optionally include electrical connections extending to the LEDs 210. In alternative embodiments, the electrical connections may be provided to the LEDs 210 separate from the LED layer 21. The LEDs 210 are all positioned such that a majority of light output therefrom is primarily directed toward the optical layer 22. The optical layer 22 may be a flexible optical diffuser sheet, containing information for display and for illumination by the LED layer 21. The optical layer 22 may additionally or alternatively include a phosphor in some embodiments to alter the color of light emitted there through.

The multilayer lighting sheet 20 is formed as a flexible multilayer lighting sheet foil composed of the LED layer 21 and the optical layer 22, which can be rolled up on a roll or drum 12 for transport or storage. As such, the optical layer 22 and the LED layer 21 are jointly mounted with their respective free layer edges 22*a* and 21*a* at a joint mounting position 12-1 at the outer circumference 12*a* of the drum 12 (and their other free layer edges 22*a*-21*b* extending outside the housing 11). This mounting configuration allows that the multilayer lighting sheet 20 is movable between a retracted position, wherein the multilayer lighting sheet 20 is more or less partially retracted in one or more windings around the rotatable drum 12 within the housing 11 and in a protracted position wherein the multilayer lighting sheet 20 is fully unwound from the rotatable drum 12 and protracted from the housing 11.

This fully protracted position is depicted in FIG. 1. Such poster like display boxes are used at events, such as conventions, or for promotions in retail environments, such as shops, galleries, showrooms, and the like. When unrolled, the flexible multilayer lighting sheet foil presents a display for illumination or advertisement/information purposes, with the optical layer 22 being illuminated by the activated LED layer 21. For a proper illumination, the diffusing optical layer 22 needs to be spaced at an appropriate distance d from the LED layer 21, in particular to minimize the appearance of a light-dot pattern from the activated LEDs 210 and/or may help mix light output from multiple colors of LEDs 210.

In the example according to the prior art the LED layer 21 and the optical layer 22 of the multilayer lighting sheet 20 are in an expanded spaced relation to one another downstream of a pair of compression rollers 13*a*-13*b* and in a compressed relation to one another upstream of the compression rollers 13*a*-13*b*. When in the protracted orientation the LED layer 21 and the optical layer 22 are move away from each other and maintained in a desired spaced apart orientation by means of a spacer mechanism 23 present between both layers, here mechanical awning parts such as folding awning arms.

Figure 2:
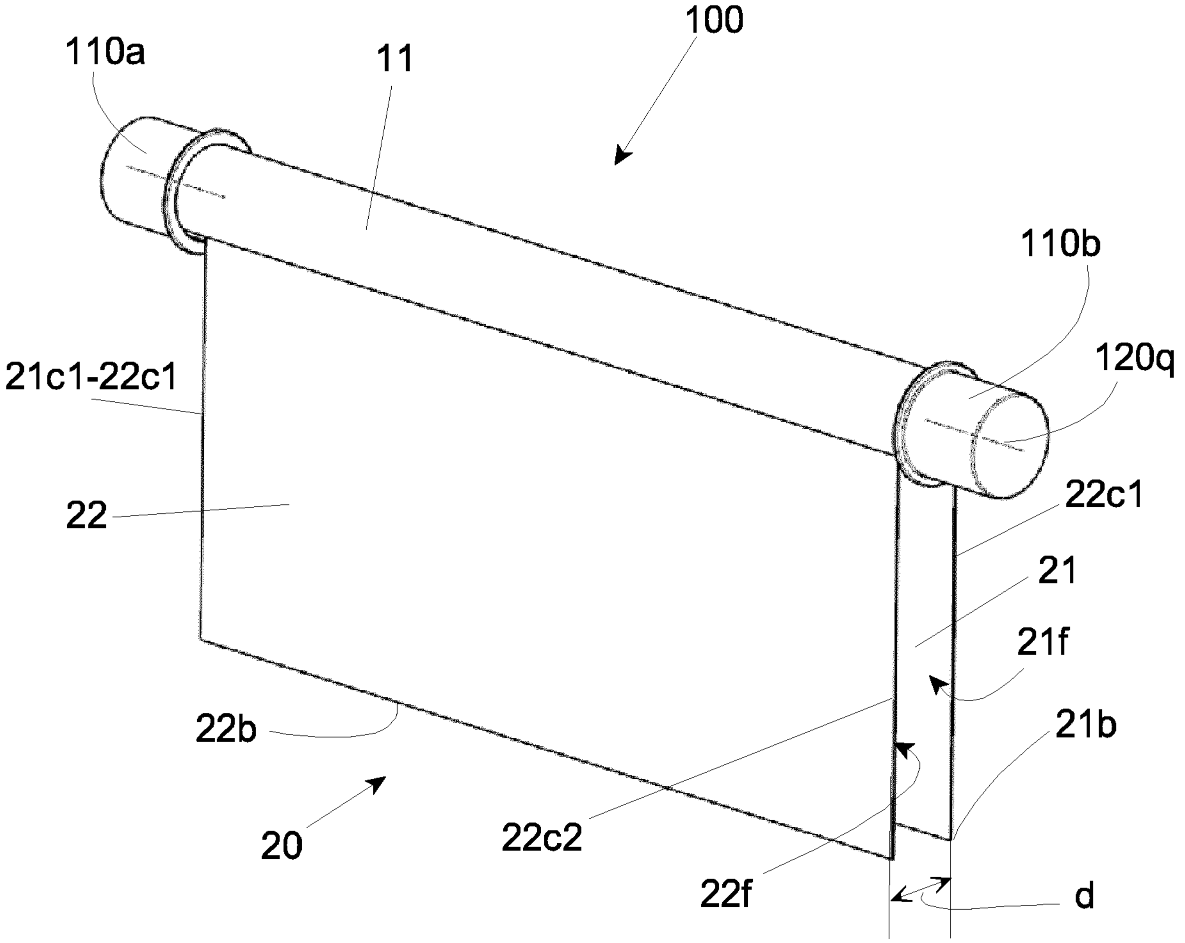
FIG. 2 an example of a retractable lighting fixture according to the disclosure.

FIG. 2 depicts an example of the retractable lighting fixture according to the disclosure exhibiting a less complex and expensive construction as presently known in the art. The example according to the disclosure also allows for an easy exchange of the optical layer 22, which is essential for a poster backlighting solution, with another optical layer 22 containing differentiation information to be displayed and illuminated.

The example of the retractable lighting fixture according to the disclosure is denoted with reference numeral 100 and also comprises a housing 11 provided with end caps 110*a*-110*b* at both its open housing ends and an elongated, rotatable drum 120 (not depicted) accommodated in the housing 11. Please note that the housing 11 is a non-essential part of the several examples of the retractable lighting fixture according to the disclosure as described in this application. Similarly as in the prior art example of FIG. 1, a multilayer lighting sheet 20 composed of a LED layer 21 and at least one diffusing optical layer 22 is accommodated around the drum 120 in one or more windings. The at least one optical layer 22 may be a flexible optical diffuser sheet, containing information for display and for illumination by the LED layer 21.

In FIG. 2, the multilayer lighting sheet 20 is depicted in the protracted position wherein the multilayer lighting sheet 20 is unwound from the elongated, rotatable drum 120 and protracted from the housing 11. As such, the elongated drum 120 is rotatable along its longitudinal axis 120*q*. In this example the multilayer lighting sheet 20 is composed of one LED layer 21 and one diffusing optical layer 22. In this protracted position both the LED layer 21 and the optical layer 22 are maintained in a desired spaced apart orientation, by a distance d measured between the outer, lowest free hanging layer edges 21*b* and 22*b*, respectively.

Figure 3A:
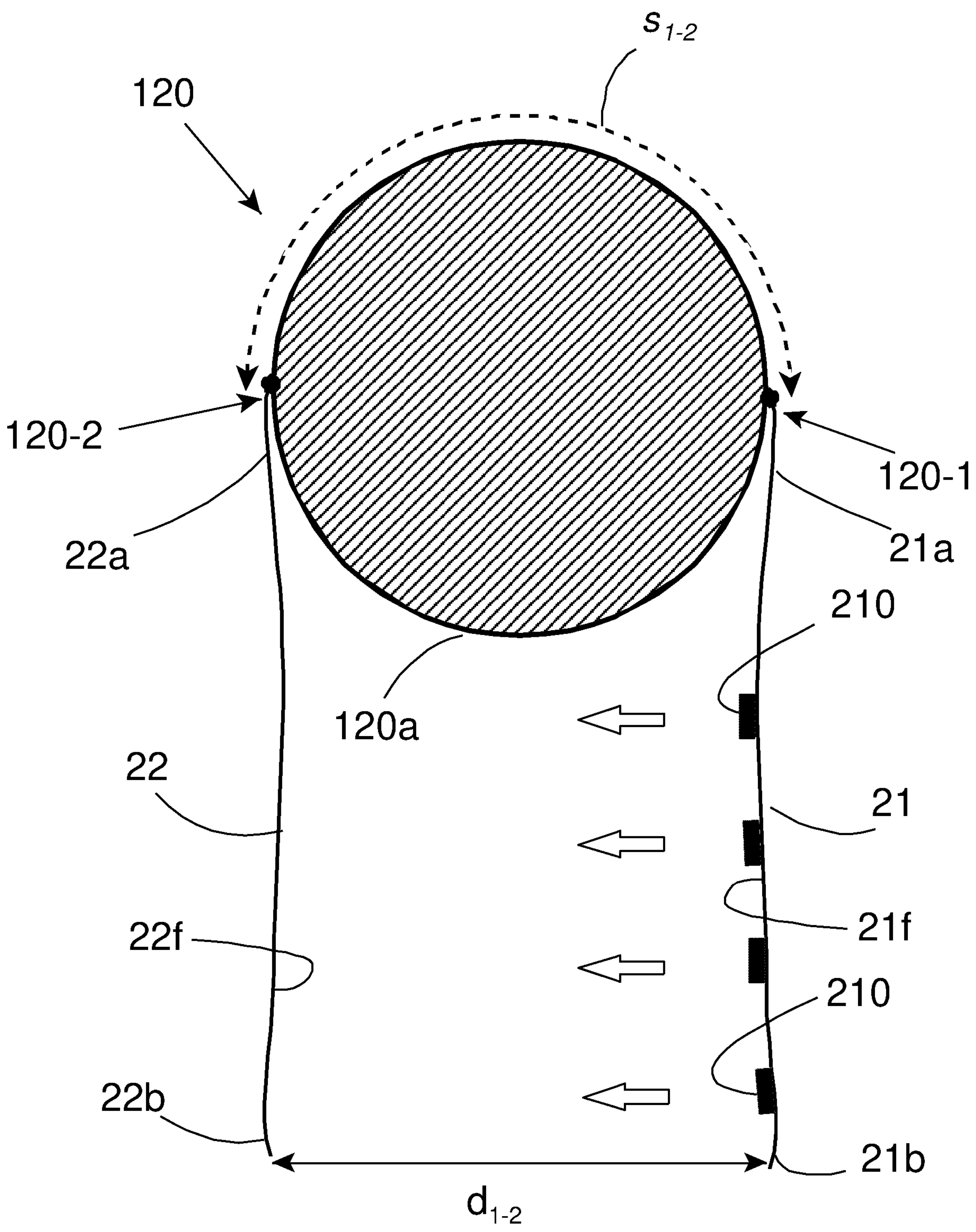
FIG. 3A a detail of an example of a retractable lighting fixture according to the disclosure.

The protracted position or orientation of the LED layer 21 and the optical layer 22 is shown in more detail of FIG. 3*a*, depicted a schematic side view of the drum 120 of the example of the retractable lighting fixture 100. Please note that schematic view does not necessarily shows the parts of the retractable lighting fixture 100 on scale, but merely is intended to disclose the functional features of this example.

In FIG. 3*a* the drum 120 has a cylindrical configuration having a diameter D and a longitudinal dimension, more or less similar to the longitudinal dimension of the housing 11. The LED layer 21 is also provided with multiple LED elements 210 and has a first LED layer edge 21*a* which is mounted at the outer circumference 120*a* of the rotatable drum 120 at a first position, being indicated with reference numeral 120-1. Similarly, the diffusing optical layer 22 containing the information to be displayed and illuminated by the LED layer 21, has a first optical layer edge 22*a*, which is mounted at a second position, indicated with reference numeral 120-2, at the outer circumference 120*a* of the rotatable drum 120.

As shown in FIG. 3*a*, the first position 120-1 is located at some distance from the second position 120-2, in particular the first position 120-1 is positioned at an arc length $s_{1-2}$ along the circumference 120*a* from the second position 120-2. With both LED layer 21 and diffusing optical layer 22 being mounted at different positions 120-1 and 120-2 at the outer circumference 120*a* of the drum 120, both layers 21-22 will be automatically spaced apart from each other at a distance $d_{1-2}$ measured between both free falling layer edges 21*b* and 22*b*, when unwound and protracted from the housing 11. No additional spacer mechanism is required and due to the spacing $d_{1-2}$ thus created a correct and effective illumination of the information containing optical layer by means of the LED layer is achieved.

The spacing $d_{1-2}$ between both LED layer 21 and diffusing optical layer 22 can be considered being equal to the chord distance between both first and second positions 120-1 and 120-2 at the outer circumference 120*a* of the drum 120. In this particular example of FIG. 3*a*, both first and second positions 120-1 and 120-2, respectively, are located at opposite sides of the rotatable drum 120, more or less at 180°. The arc length $s_{1-2}$ is thus a semicircle and is equal to $\frac{1}{2}\cdot\pi\cdot D$, with D being the diameter of the drum 120. Similarly, the corresponding chord length or distance $d_{1-2}$ corresponding with the arc length $s_{1-2}$ defines the spacing between both layers in the fully unwound or unrolled, protracted orientation. Said spacing $d_{1-2}$ equals the diameter D of the drum 120.

Figure 3B:
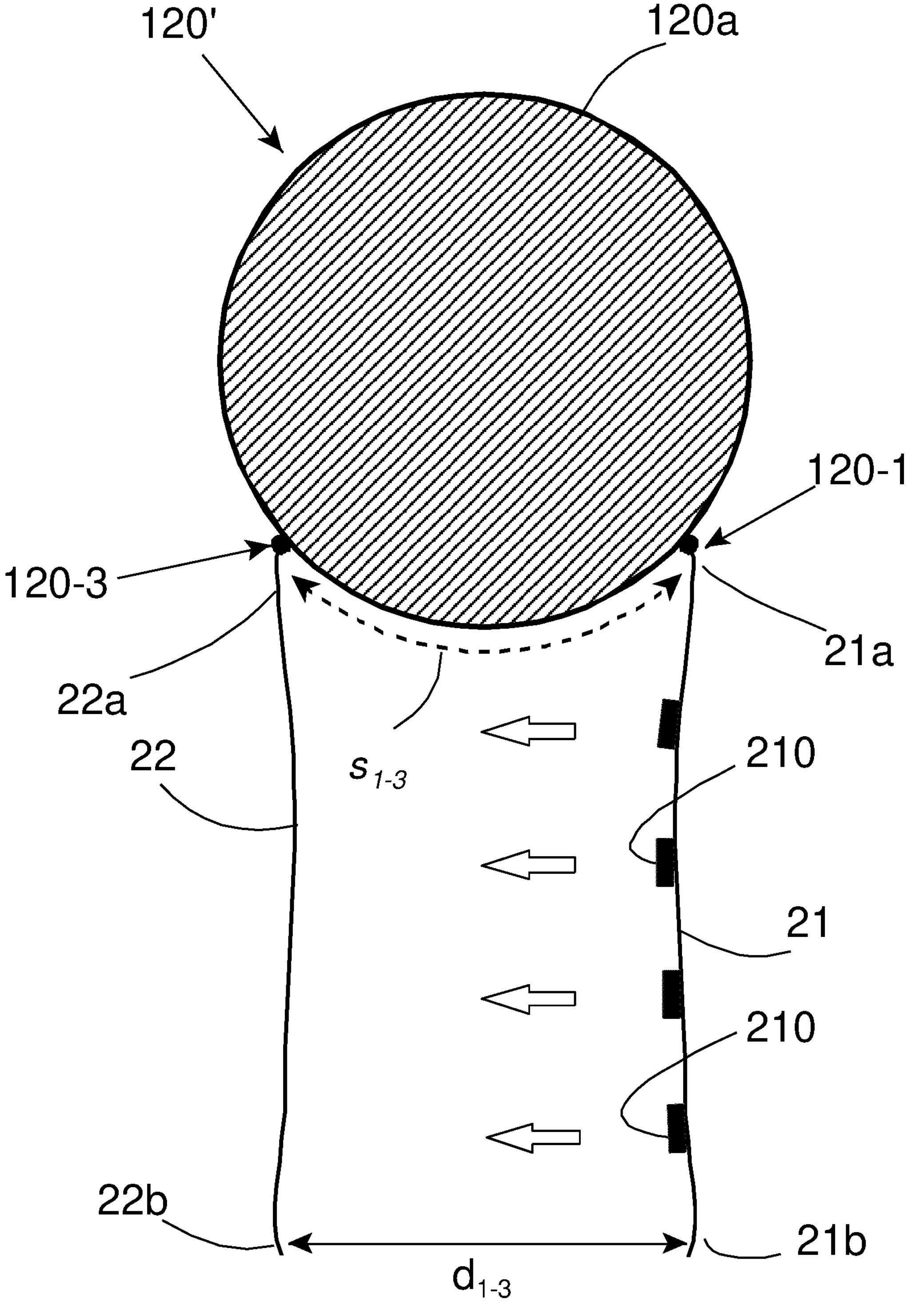
FIG. 3B another detail of an example of a retractable lighting fixture according to the disclosure.

FIG. 3*b* shows another configuration example of the drum 120' for use in a retractable lighting fixture 100 according to the disclosure, with the first position 120-1 being the mounting position for the free layer edge 21*a* of the LED layer 21 and another mounting positon 120-3 being the mounting position for the free layer edge 22*a* of the optical layer 22. The other mounting positon 120-3 is also located at a distance from the first position 120-1, which distance however differs from the example of FIG. 3*a*. In particular the first position 120-1 is positioned at an arc length $s_{1-3}$ along the circumference 120*a* from the further position 120-3, which arc length $s_{1-3}$ corresponds with 90°. When fully unwound and protracted from the housing 11 both LED layer 21 and diffusing optical layer 22 will be spaced apart from each other at a distance $d_{1-3}$, again measured between both free falling layer edges 21*b* and 22*b*.

The spacing $d_{1-3}$ between both LED layer 21 and diffusing optical layer 22 is equal to the chord distance between both first and further positions 120-1 and 120-3 at the outer circumference 120*a* of the drum 120, in this example of FIG. 3*b*, the arc length $s_{1-3}$ being a quarter circle equal to $\frac{1}{4}\cdot\pi\cdot D$, again with D being the diameter of the drum 120.

Preferably, the arc length s between the mounting position of the free layer edge 21*a* of the LED layer 21 and the mounting position of the free layer edge 22*a* of the optical layer 22 may range between 30°-330°, for example between 45°-315° and in particular between 90°-270°. Herewith specific spacing distances d, equal to the chord length of the respective arc length s, between the two layers 21-22 can be achieved in the fully unwound or unrolled, protracted orientation, thus achieving a desired illuminance of the optical layer 22 and hence an optimal visualization and presentation of the information contained thereon.

Figure 3C:
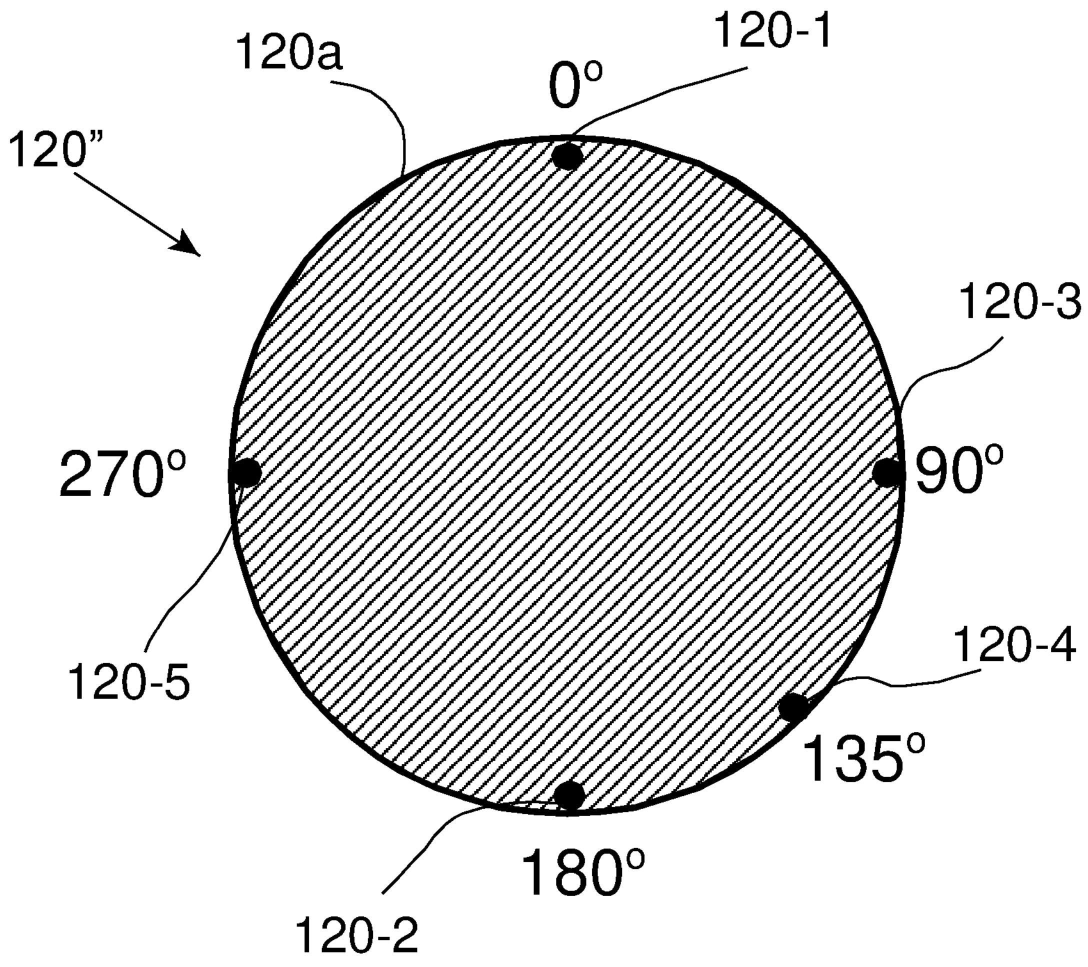
FIGS. 3C-D further details of examples of a retractable lighting fixture according to the disclosure.

FIG. 3*c* shows a schematic example of a drum 120" for use in a retractable lighting fixture 100 according to the disclosure with several distinct mounting positions denoted 120-1, 120-2, 120-3, 120-4 and 120-5 for either free layer edge 21*a*-22*a* of the LED/optical layer 21-22. The mounting positions 120-1, 120-2, 120-3, 120-4 and 120-5 are located at the outer circumference 120*a* of the drum 120" at angle orientations 0°-180°-90°-135° and 270° respectively.

Figure 3D:
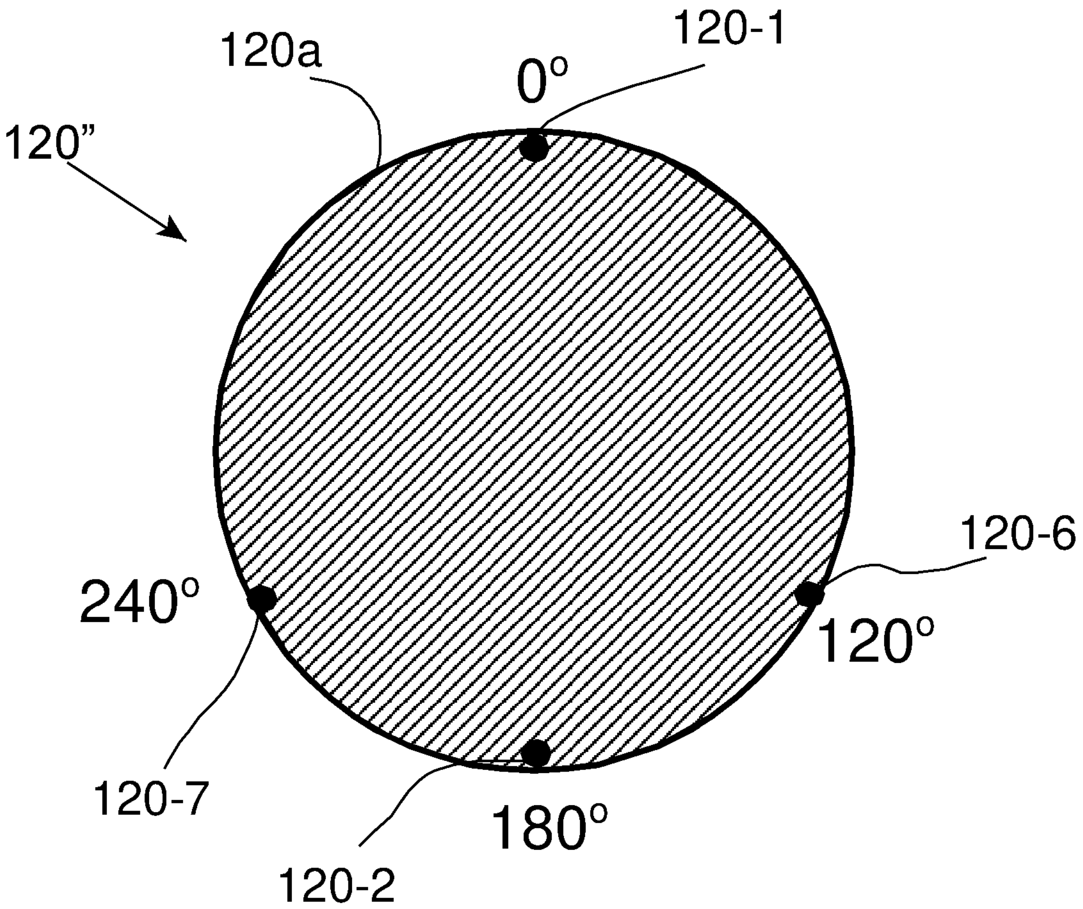

For example, as shown in FIGS. 3*c* and 3*d*, the several mounting positions (the first position 120-1, second position 120-2 and further positions 120-*x*, with the suffix x being 3, 4, 5 . . . etc.) are located at the outer circumference 120*a* of the drum 120" at equidistant arc lengths from each other, for example at equidistant arc lengths of 90° or 120°. In FIG. 3*c* the mounting positions 120-1/120-3/120-2/120-5 are each positioned at equidistant arc lengths of 90° ($s=\frac{1}{4}\cdot\pi\cdot D$), whereas in FIG. 3*d* the mounting positions 120-1/120-6/120-7 are each positioned at equidistant arc lengths of 120° ($s=\frac{1}{3}\cdot\pi\cdot D$). Similarly, in FIG. 3*d* the mounting positions 120-1 and 120-2 are each positioned at equidistant semicircle arc lengths of 180° ($s=\frac{1}{2}\cdot\pi\cdot D$). These examples effectively present a retractable lighting fixture with a rotatable multi-spacing drum, allowing the multilayer lighting sheet 20 to be set up in the unwound or unrolled, protracted orientation with a spacing which can be selected in advance by mounting the LED layer 21 and the optical layer 22 in positions distanced by a pre-selected arc length.

Figure 4A:
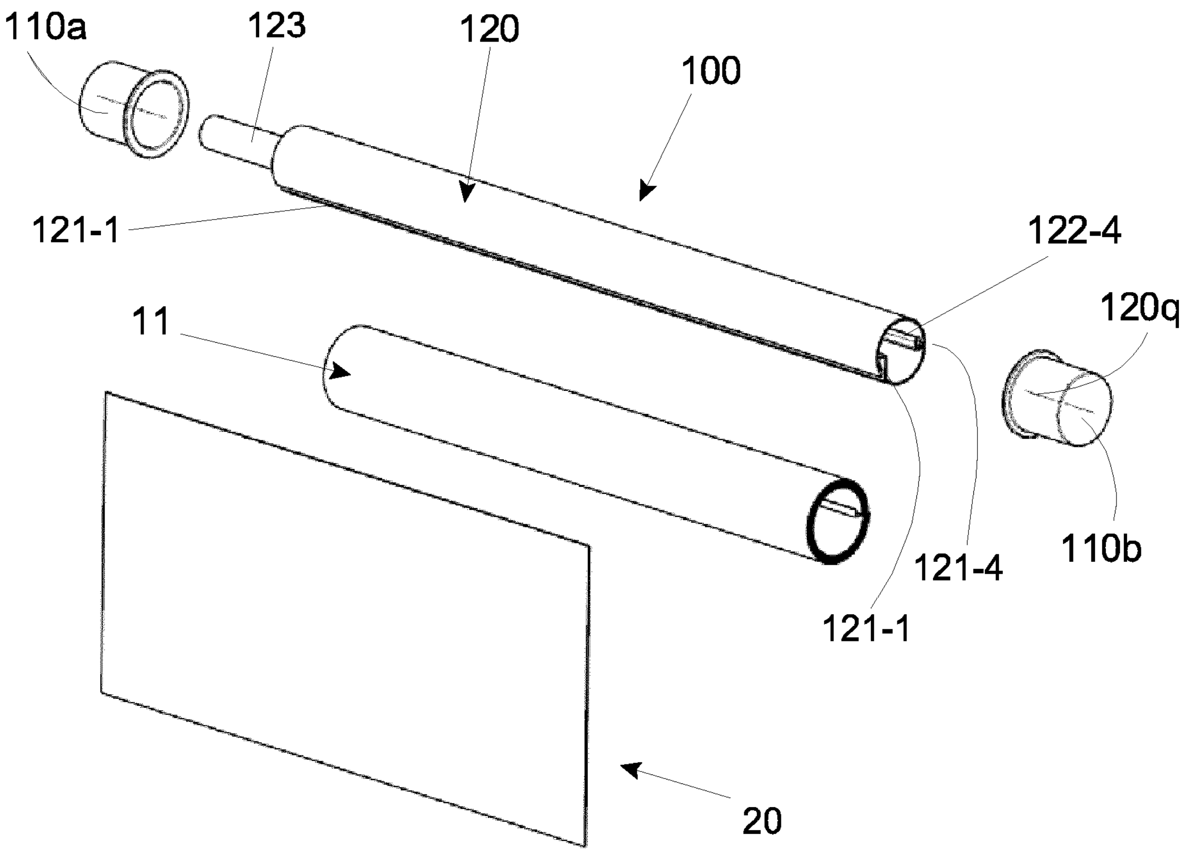
FIG. 4A a further example of a retractable lighting fixture according to the disclosure.

Another example of a retractable lighting fixture according to the disclosure is depicted in FIG. 4*a* and denoted with reference numeral 100. In this embodiment the drum 120 is accommodated in the housing 11, which in turn can be shielded at its open free ends with end caps 110*a*-110*b*. The drum 120 comprises at its outer circumference 120*a* a first groove 121-1 located at a position, which is denoted as the first position 120-1 in the several FIGS. 3*a*-3*d*. The drum 120 also comprise a second groove, which is denoted with reference numeral 121-4, as the groove is located at the outer circumference 120*a* of the drum 120''' at a position, which is denoted with reference numeral 121-4 in for example FIG. 3*c*. Both grooves 121-1 and 121-4 are distanced from each other by an arc length $s_{1-4}$ which is equal to 135°.

The drum 120''' accommodates the several windings of the multilayer lighting sheet 20, wherein the first groove 121-1 accommodates the free LED layer edge 21*a* of the LED layer 21 and the first groove 121-4 accommodates the free optical layer edge 22*a* of the optical layer 22. This allows the LED and optical layers 21-22 to be easily inserted and secured to the rotatable drum 120'''.

The grooves 121-1 and 121-4 extend in the longitudinal direction of the drum 120''' as shown in FIG. 4*a*, thus allowing a proper accommodating of the free layer edge of the LED layer 21 and the optical layer 22 over the entire layer width in their respective groove. Also, with the several grooves present in the outer circumference 120*a* of the rotatable drum 120 and the free edges 21*a* or 22*b* of the layer mounted therein an improved rolling up and down of multilayer lighting sheet 20 is achieved without the risk of folds, greases, wrinkles or damages to both layers.

Figure 4B:
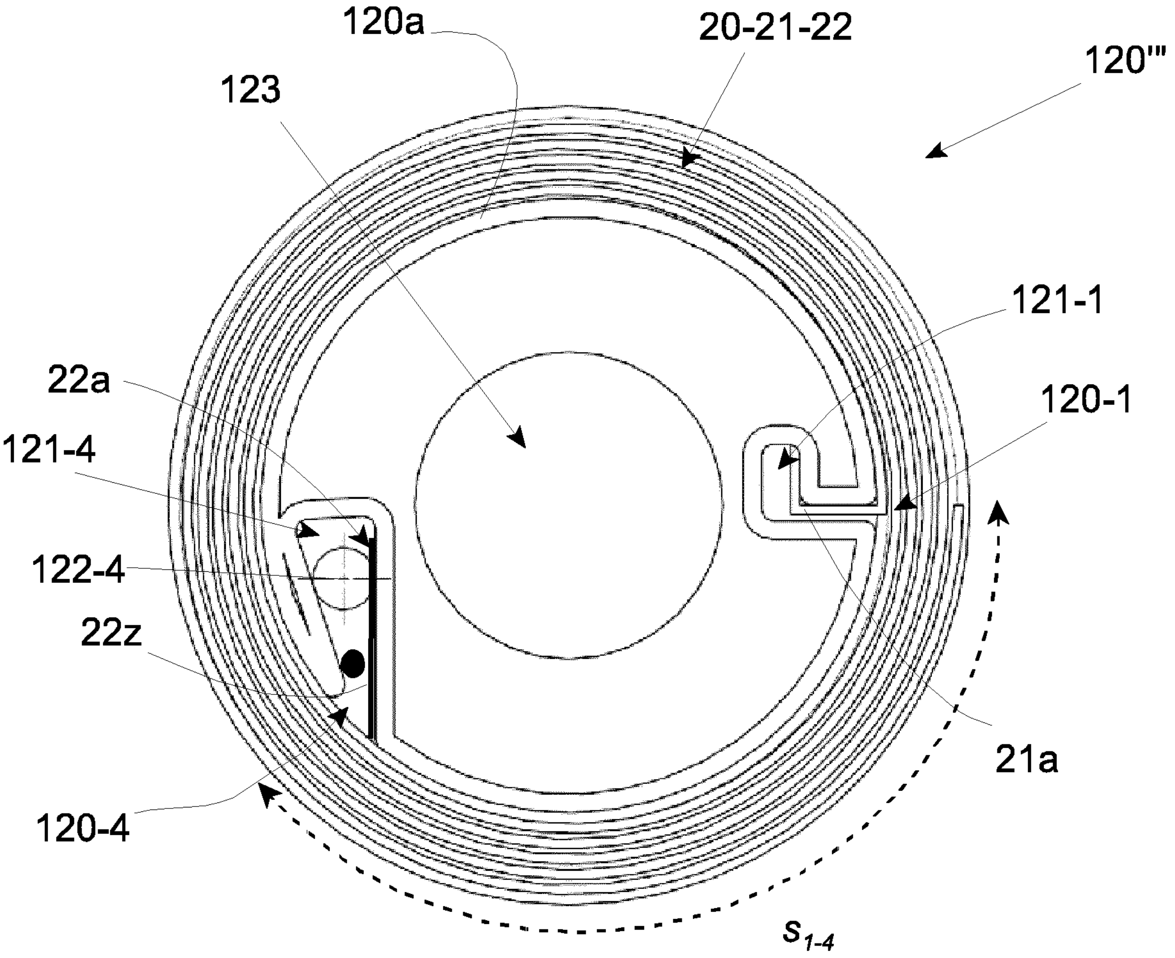
FIGS. 4B-4C details of the further example of a retractable lighting fixture according to the disclosure of FIG. 4A.
Figure 4C:
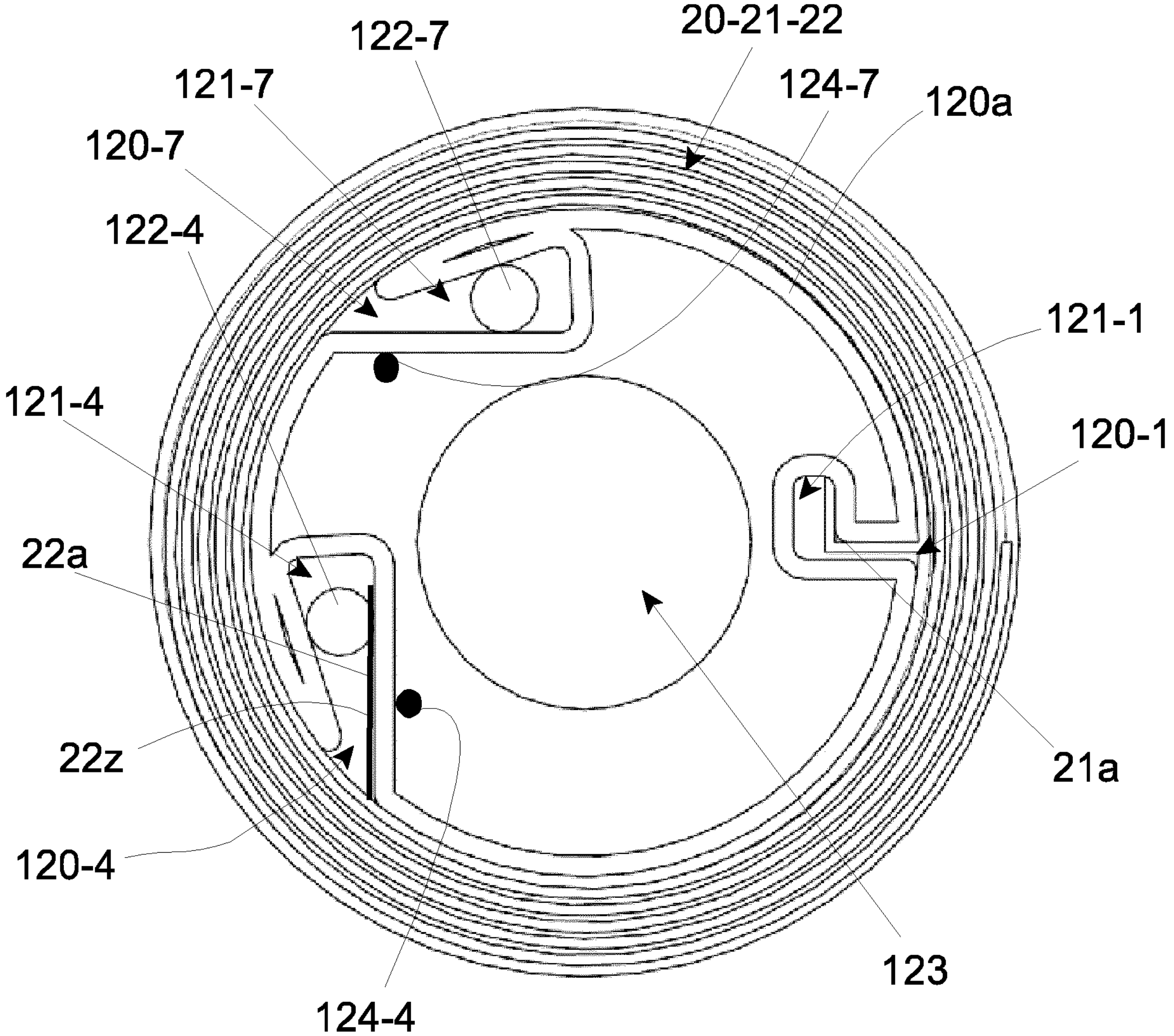

In an improvement of the disclosure, shown in FIG. 4*c*, the rotatable drum 120 at its outer circumference 120*a* comprises at least one further groove at a further position different from the first and second position. In FIG. 4*c* the further groove is denoted with reference numeral 121-7 and is located at position 120-7 as shown in FIG. 3*d*. The further groove 121-7 has an arc length $s_{1-7}$ with the first position/groove 120-1/121/1 of 240° ($s_{1-7}$=⅔·π·D) and has an arc length $s_{4-7}$ with the second position/groove 120-4/121/4 of 240°-135°=95° ($s_{4-7}$≈¼·π·D). This allows to mount the LED layer 21 and optical layer 22 to the drum 120''' at several different positions, allowing an easy exchange of one of the layers, but also to select the correct spacing $d_{1-4}$, $d_{1-7}$ or $d_{4-7}$ defined by the chord corresponding with the arc length $s_{1-4}$ or $s_{1-7}$ or $s_{4-7}$ between the two selected mounting positions for the LED layer 21 and the optical layer 22, respectively.

The possibility to select the correct (chord) spacing between the layers 21 and 22 allows for a simple adjustment or selection of the proper, desired illuminance of the optical layer 22 using the LED layer 21. It is noted that FIG. 4*b* depicts three grooves 121-*x* as a mere example, and that the drum 120 can be provided with multiple grooves 121-*x* (with x∈[1 . . . N], N being a natural number) with any desired arc length orientation as depicted in FIGS. 3*a*-3*d*.

The drum 120 can be made hollow (in part) to accommodate one or more LED drivers 123 for receiving a supply power and for driving the LED layer 21 based on said received supply power. The supply power (not depicted) can also be retained within the drum 11 and can be embodied as a (rechargeable) or otherwise replaceable battery pack. In some embodiments the one or more LED drivers 123 can be electrically coupled to a mains power supply via suitable circuitry (printed circuit board circuitry). Also a solar panel and/or other external power supply may be utilized as a supply power for the driver 123. In alternative embodiments the supply power may be located outside of the drum 120 or housing 11.

For a proper and secure mounting of the free layer edges 21*a*-22*a* of both the LED layer 21 and the optical layer 22 in either groove present in the drum 120-120'-120"-120'''-120"" clamping means can be accommodated in each groove. The clamping means can constitute a narrow inner space of the groove, such as shown with groove 121-1, thus clamping the free layer edge 21*a* of the LED layer 21 with its both layer sides against the walls of the groove 121-1. This clamping mechanism also guarantees a proper electrical contact between the driver 123 and electrical connections (not shown) present in the groove 121-1, which electrically connect with electrical connections present on the LED layer 21, which in turn extending in the LED layer 21 towards the several LEDs 210 for energizing the latter.

In a particular example according to the disclosure, the clamping means may constitute ball clamp mechanism comprising multiple balls or a ball rod 122-4 and 122-7 accommodated in each groove 121-4 and 121-7 for holding the free layer edge 22*a* of the optical layer in a clamping fashion the groove 121-4 or 121-7. See also FIG. 4*a*.

Alternatively, each groove 121-*x* can be structured as a small slit through the circumference 120*a* of the drum 120. Each free, first layer edge 21*a*-22*a* of either LED layer 21 and diffusing optical layer 22 can be provided with a thickened ridge. By sliding the layers 21-22 in their respective slit, the thickened ridge will extend inside the drum and behind the slit thus preventing a release of the respective layer.

The optical layer 22 may be provided at its free optical layer edge 22*a* with an identification characteristic denoted with 22*z*. The identification characteristic 22*z* provided at the optical layer edge 22*a* can be a barcode (QR-code), a punch pattern, or a RFID tag, and can identify the optical layer e.g. as to its optimal illumination settings. Preferably, near each of the grooves 121-*x* (with x∈[1 . . . N], N being a natural number) a sensing element 124-4 (124-7) can be provided, either in the respective groove as shown in FIG. 4*b* or inside the drum 120' next to each groove as shown in FIG. 4*c*.

The sensing element 124-4 (124-7) can sense the identification characteristic 22*z* of the diffusing optical layer 22, when the optical layer 22 is mounted with its free layer edge 22*a* at either mounting position sec. in either groove. As in a particular example, the identification characteristic 22*z* defines the optimal illumination settings for the associated optical layer, the sensing element 122-*x* (with x∈[1 . . . N], N being a natural number) can control the driver 123 in response to the identification characteristic 22*z* of the diffusing optical layer being sensed. For example, with the identification characteristic 22*z* characterizing the optimal illumination settings for the associated optical layer 22, an adaptive lighting fixture 100 can be used, capable of adapting the light output of the LED layer 21 and thus optimally adapt the illuminance of the optical layer 22 mounted in the groove.

To facilitate effective full unrolling of the multilayer lighting sheet 20 and also to maintain stability for windy outdoor conditions the second LED layer edge 21*b* of the LED layer 21 and the second optical layer edge 22*b* of the diffusing optical layer 22 are provided with one or more weight elements, for example as weight rod extending over the full width of the layers 21-22 and worked in the material of the layers near their layer edges 21*b*-22*b*.

Figure 5A:
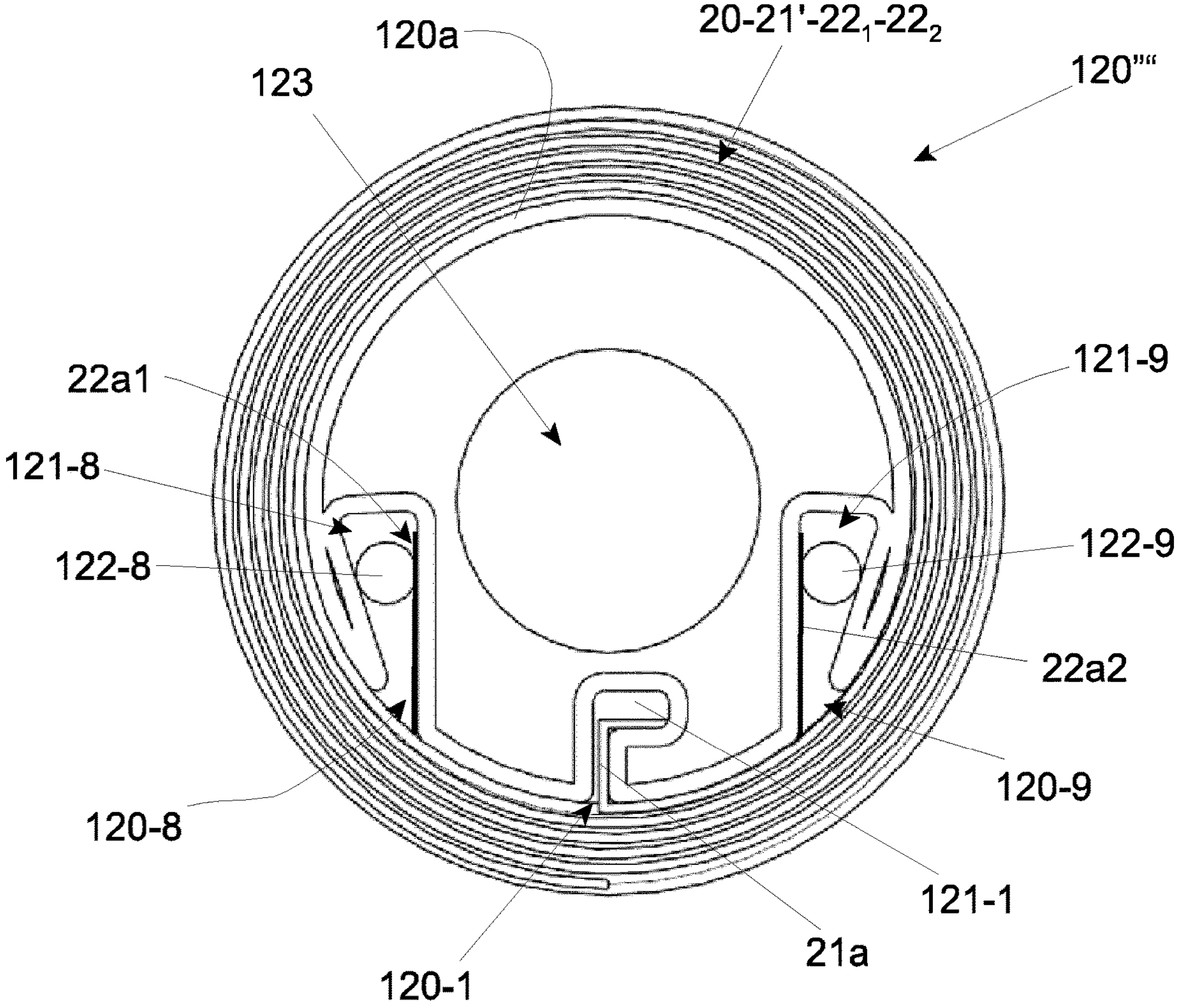
FIGS. 5A-5B details of yet a further example of a retractable lighting fixture according to the disclosure.
Figure 5B:
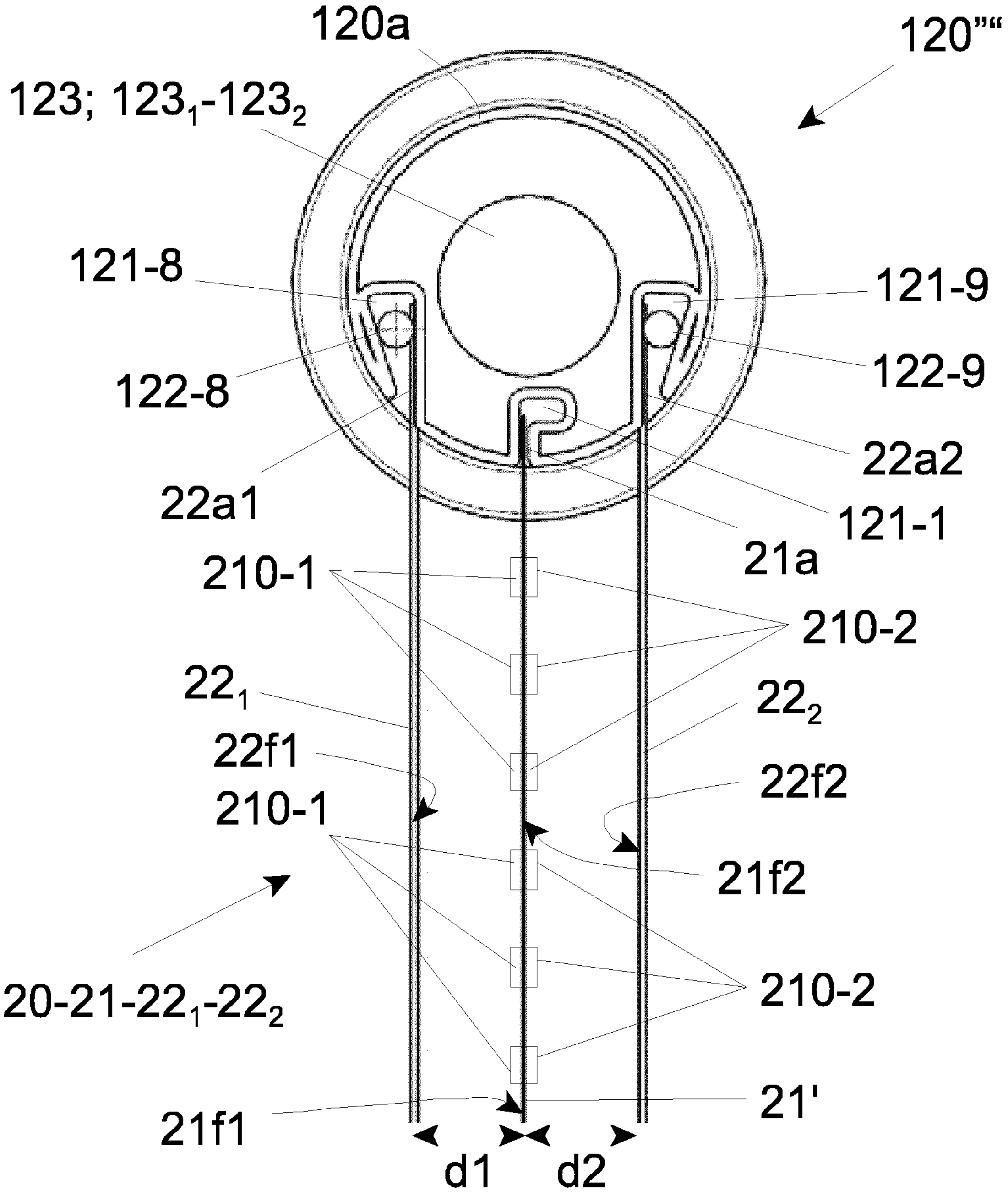

In FIGS. 5*a* and 5*b* another example of a retractable lighting fixture 100 according to the disclosure is shown. FIGS. 5*a* and 5*b* depict a specific configuration of the multilayer lighting sheet 20, which is composed of one LED layer 21' and two diffusing optical layers $22_1$ and $22_2$. The associated drum 120"" of this example is provided with three mounting positions, denoted with 120-1, 120-8 and 120-9. Similarly as depicted in FIGS. 4*a*-4*c*, the mounting positions 120-1, 120-8, 120-9 are structured as grooves 121-1, 121-8, 121-9 in the outer circumference 120*a* of the drum 120"" and extending in longitudinal direction thereof.

In this example, with the multilayer lighting sheet 20 fully unwound from the drum 120"" and protracted from the housing, the LED layer 21' is sandwiched between the two diffusing optical layers 221 and 222, which are unwound at either side of the LED layer 21'. The LED layer 21' is a so-called dual sided LED layer, having two LED groups, each comprising a plurality of LEDs 210-1 and 210-2, and with each group of LEDs 210-1/210-2 being provided on either surface 21*f*1 and 21*f*2. Each layer 21*f*1-21*f*2 may optionally include electrical connections extending to each group of LEDs 210-1/210-2. In alternative embodiments, the electrical connections may be provided to the LEDs separate from the LED layer 21'.

The two groups LEDs 210-1/210-2 of the dual sided LED layer 21' are all positioned such that a majority of light output therefrom is primarily directed toward the each optical layer $22_1$ and $22_2$ facing either LED layer surface 21*f*1 and 21*f*2. With this example, it is possible to display and illuminate two diffusing optical layers $22_1$ and $22_2$ simultaneously with one dual sided LED layer 21'.

In a further example, the retractable lighting fixture incorporating a drum 120""" with a sandwiched multilayer lighting sheet 20-21'-22$_1$-22$_2$ of FIGS. 5*a* and 5*b*, is preferably powered using two drivers 123 accommodated in the drum 120"", for separately energizing each group of LEDs 210-1 and 210-2 provided on either surface 21*f*1-21*f*2 of the dual sided LED layer.

Accordingly, with reference to the examples of FIGS. 4*b* and 4*c*, also in FIGS. 5*a* and 5*b* near each mounting position 120-8 and 120-9 or in each corresponding groove 121-8 and 121-9 a sensing element 122-9 and 122-9 can be accommodated, for sensing the identification characteristic 22*z* of either diffusing optical layer $22_1$ and $22_2$ mounted with their first layer edge 22*a*1 and 22*a*2 at that mounting position sec. in either groove.

Similarly, as the identification characteristic 22*z* of the corresponding diffusing optical layer $22_1$ and $22_2$ define the optimal illumination settings for the associated optical layer, the sensing element 122-8 and 122-9 can control the driver 123 or either separate driver associated with one of the LED groups 210-1/210-2 in response to the identification characteristic 22*z* of the diffusing optical layer $22_1$ and $22_2$ being sensed. Herewith, the illuminance of two optical layers $22_1$ and $22_2$ sandwiching the dual sided LED layer 21' can thus be optimally adapted by one dual sided LED layer 21'.

With reference to the several configurations of the mounting positions in FIGS. 3*a*-3*d*, the arc lengths $s_{1-8}$, $s_{1-9}$ and $s_{8-9}$ between the several mounting positions 120-1, 120-8, 120-9 can be arbitrary chosen. In the example of FIG. 5*a*, the mounting position 120-1 serves to accommodate the first layer edge 21*a* of the LED layer 21', whereas the mounting positions 120-8 and 120-9 serve to accommodate the respective first layer edges 22*a*1 and 22*a*1 of the two diffusing optical layers $22_1$ and $22_2$, respectively. From FIGS. 5*a* and 5*b* it is clear that the mounting positions 120-8 and 120-9 for the two diffusing optical layers $22_1$ and $22_2$ are located at either side of the mounting position 120-1 for the LED layer 21'.

In other words, in this example, the mounting positions 120-8 and 120-9 are located at equidistant, yet opposite directed, arc lengths from the centrally located mounting position 120-1. For example, with the mounting position 120-1 located at 0°/360° (see also FIGS. 3*c* and 3*d*) the mounting position 120-8 can be positioned at 30°-40°–45°-60°–90° and the mounting position 120-9 at corresponding equidistant, yet opposite positions of 330°-320°-315°–300°-270°. Alternatively, the drum 120"" can be provided with one centrally oriented mounting position 120-1 for the dual sided LED layer 21' and several mounting positions at either side of the mounting position 120-1, equidistant or non-equidistant, thus allowing a more versatile drum configuration where the two diffusing optical layers $22_1$ and $22_2$ of the multilayer lighting sheet 20-21'-$22_1$-$22_2$ can be mounted at different positions relative to the central mounting position 120-1 either equidistant or if needed at different arc length positions.

Figure 6:
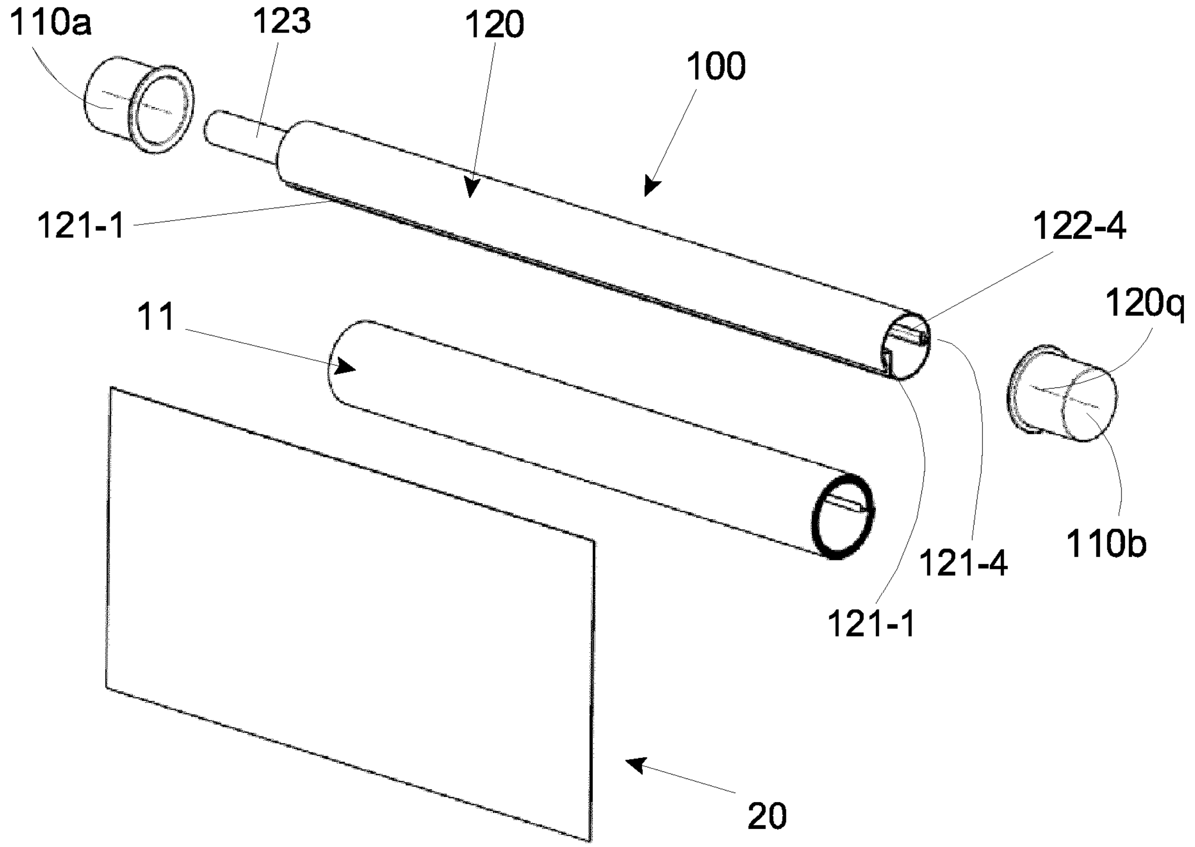
FIG. 6 another example of a retractable lighting fixture according to the disclosure.

FIG. 6 discloses yet another example of the retractable lighting fixture 100 according to the disclosure. Reference numerals 201*a*1-201*a*2-201*b* are elements of light shielding means 200, which are intended to shield light emitted by the LED layer 21 from exiting or leaking the multilayer lighting sheet 20 from the space or gap d (see FIG. 2) between both the LED layer 21 and the optical layer 22 pass the longitudinal side edges 21*c*1-22*c*1/21*c*2-22*c*2 and the bottom layer edges 21*b*-22*b* of the LED layer 21 and the optical layer 22, respectively.

In an example the light shielding means 200 are retractable mounted to the elongated drum 120, which is rotatable around its longitudinal axis 120*q*. In another embodiment the light shielding means 200 and in particular the shielding elements or sheets 201*a*1-201*a*2-201*b* are mounted to and extend along the longitudinal side edges 21*c*1-21*c*2 and to the bottom layer edge 21*b* of the LED layer 21, for example by means of by means of Velcro, magnetic strips or zip locks. Herewith, light emitted by the LED layer 21 is prevented from escaping the multilayer lighting sheet 20 along its both longitudinal side edges. With the gap or space d between both layers 21-22 being closed, no disturbing direct light from the LEDs 210 on the LED layer 21 can be seen, and also the optical efficiency is increased, as well as the light uniformity.

The light shielding means 200 (the shielding elements or sheets 201*a*1-201*a*2-201*b*) can also be used with the dual sided LED layer 21' of FIGS. 5*a* and 5*b*. When implemented with the dual sided LED layer 21' of that example the shielding elements or sheets 201*a*1-201*a*2-201*b* are mounted in a similar manner to the dual sided LED layer 21' and extend in two opposite orientations along the longitudinal side edges 21*c*1-21*c*2 and to the bottom layer edge 21*b* of the LED layer 21'. The shielding elements or sheets shield both spacings d1 and d2 formed between the optical layers $22_1$ and $22_2$ and the dual sided LED layer 21'. The mounting of the shielding elements or sheets with the dual sided LED layer 21' and/or the optical layers $22_1$ and $22_2$ can be achieved in a similar manner, for example by means of by means of Velcro, magnetic strips or zip locks.

Similarly, light emitted in both directions by the dual sided LED layer 21' towards the optical layers $22_1$ and $22_2$ is prevented from escaping the multilayer lighting sheet 20 along its both longitudinal side edges. With the gaps or spaces d1-d2 being closed, no disturbing direct light from the LEDs 210-1 and 210-2 can be seen, and also the optical efficiency is increased, as well as the light uniformity.

When retracting the flexible multilayer lighting sheet 20 back within the housing 11 by winding it in several windings on the drum 120 the shielding elements 201*a*1-201*a*2-201*b* can either be removed from the (dual sided) LED layer 21-21' (due to the releasable Velcro, magnetic strips or zip locks connections) or alternatively the shielding elements 201*a*1-201*a*2-201*b* can be folded again the (dual sided) LED layer 21-21' and retracted together the multilayer lighting sheet 20 the within the housing 11.

In all examples as disclosed in the Figures, the diffusing optical layer 22 (or optical layers $22_1$ and $22_2$) can be made from an at least partially light transmissive material. Additionally the layer surfaces 21*f* (single layer version of e.g. FIGS. 2, 3*a*-3*d*, 4*a*-4*c* and 6) and 21*f*1-21*f*2 (dual layered version of FIGS. 5*a* and 5*b*) of the LED layer 21 (21') and the layer surfaces 22*f* (22*f*1-22*f*2) of the diffusing optical layer 22 ($22_1$-$22_2$) facing each other are structured to reflect visible light. Herewith light being emitted by the LED layer 21 (21') towards the optical layer(s) 22 ($22_1$-$22_2$) and which is in part reflected back to the LED layer 21 (21'), is reflected back to the optical layer(s) 22 ($22_1$-$22_2$). This light recycling process improves the overall illuminance of the optical layer and decreases light spots on the optical layer. In a detail of the above example, the layer surfaces of the LED layer 21(21') and that of the diffusing optical layer 22($22_1$-$22_2$), which facing each other are provided with a reflective film. See in particular in FIGS. 2, 3*a*, and 5*b*).

The film or foil applied to the layer surfaces 21*f* (21*f*1-21*f*2) and 22*f*(22*f*1-22*f*2) could be made from polymers like reflective PC, PMMA, PET, PS, PP. In another example the film or foil could be a specular layer with a metal, for example aluminium added or deposited on the layers 21 (21') and 22 ($22_1$-$22_2$).

Figure 7A:
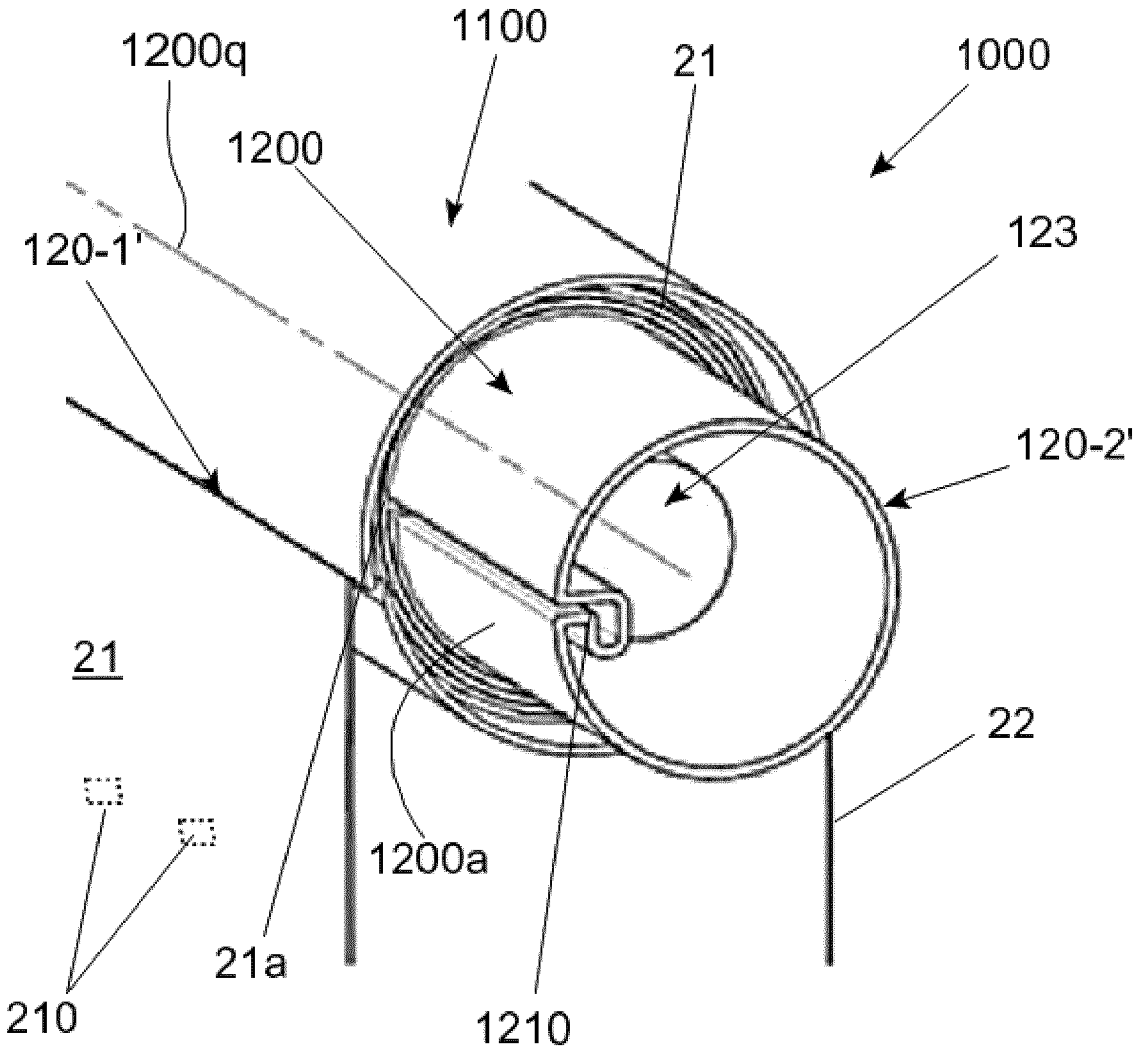
FIGS. 7A-7D further examples of a retractable lighting fixture according to the disclosure.
Figure 7B:
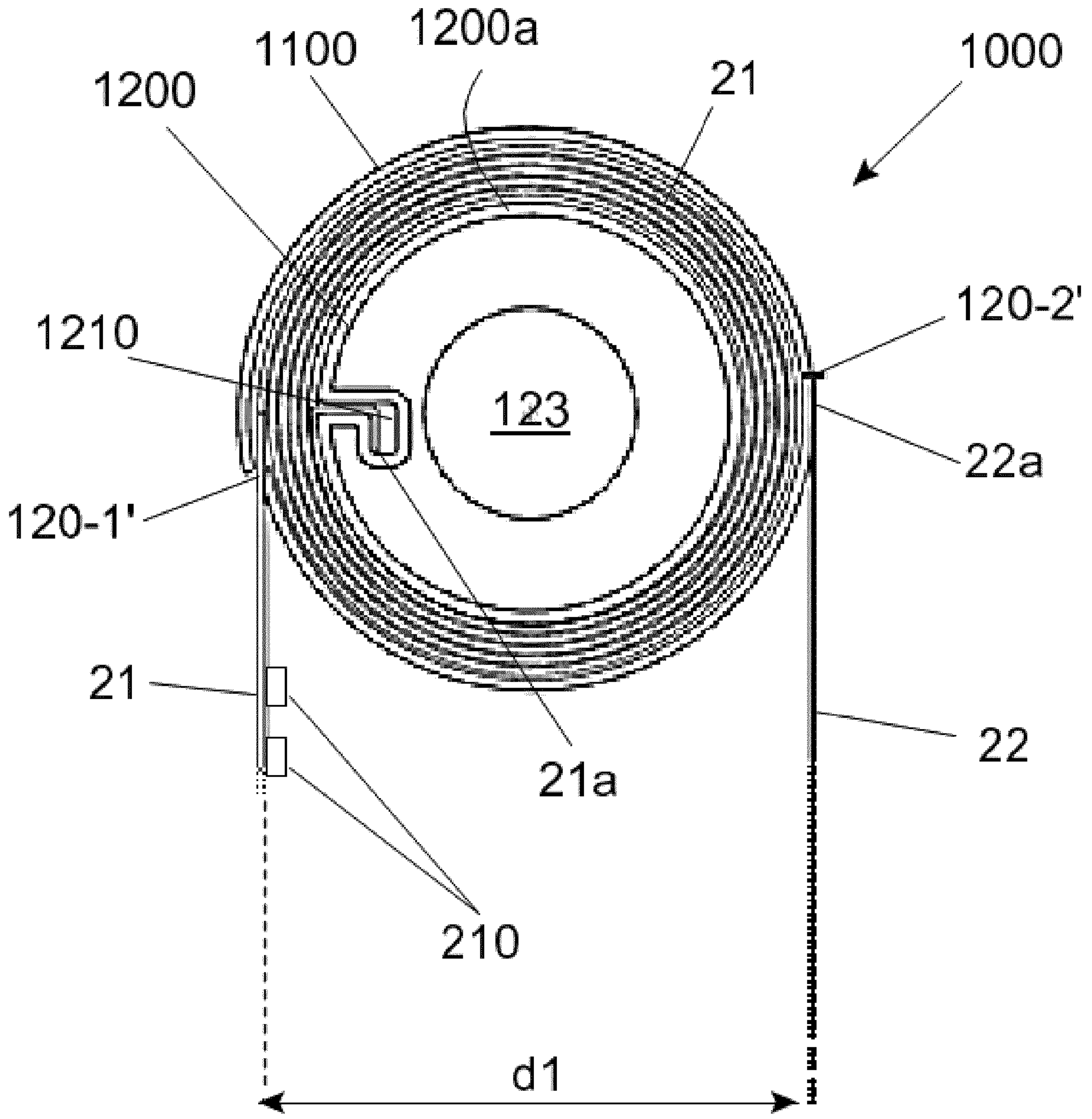
Figure 7C:
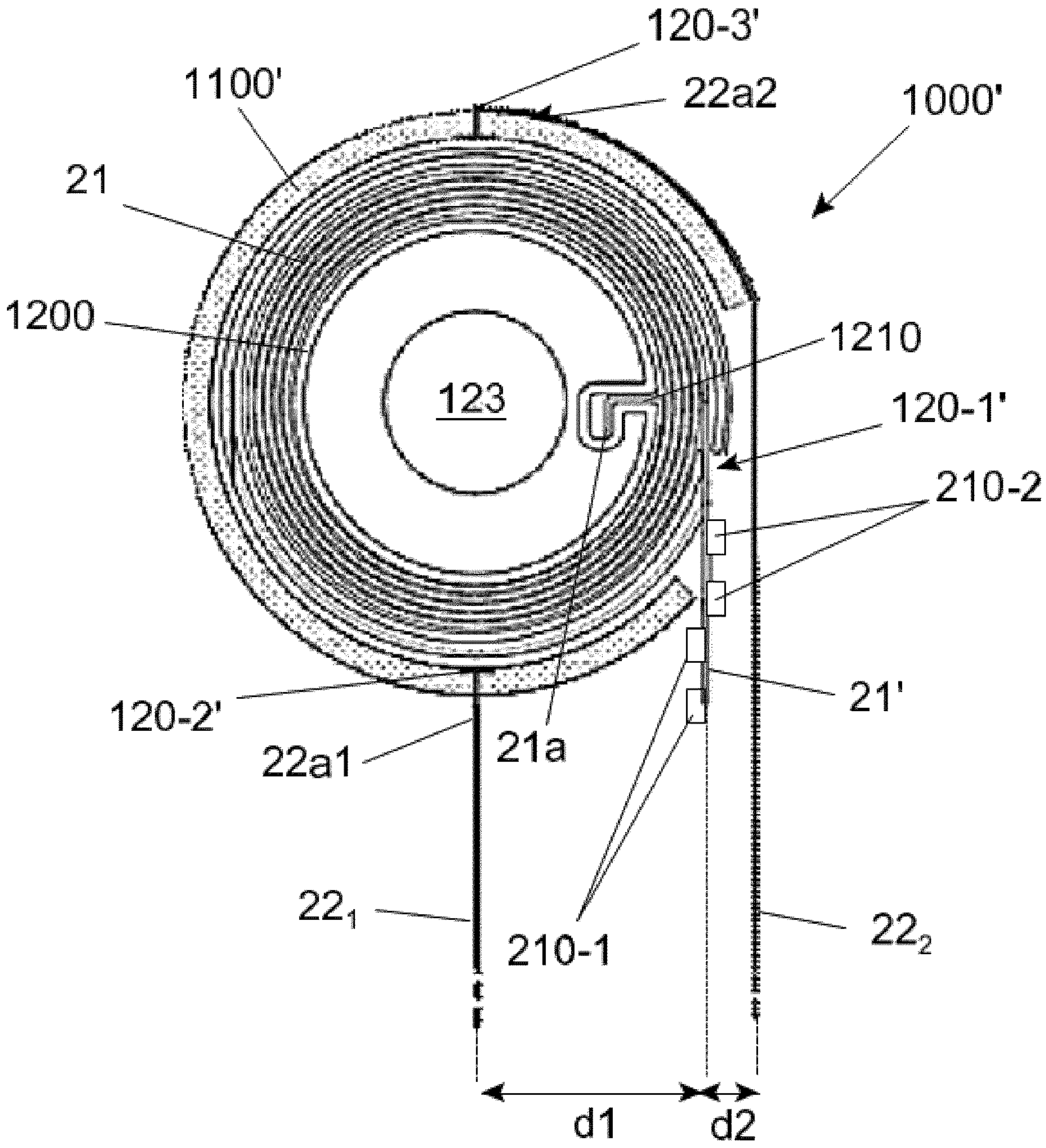
Figure 7D:
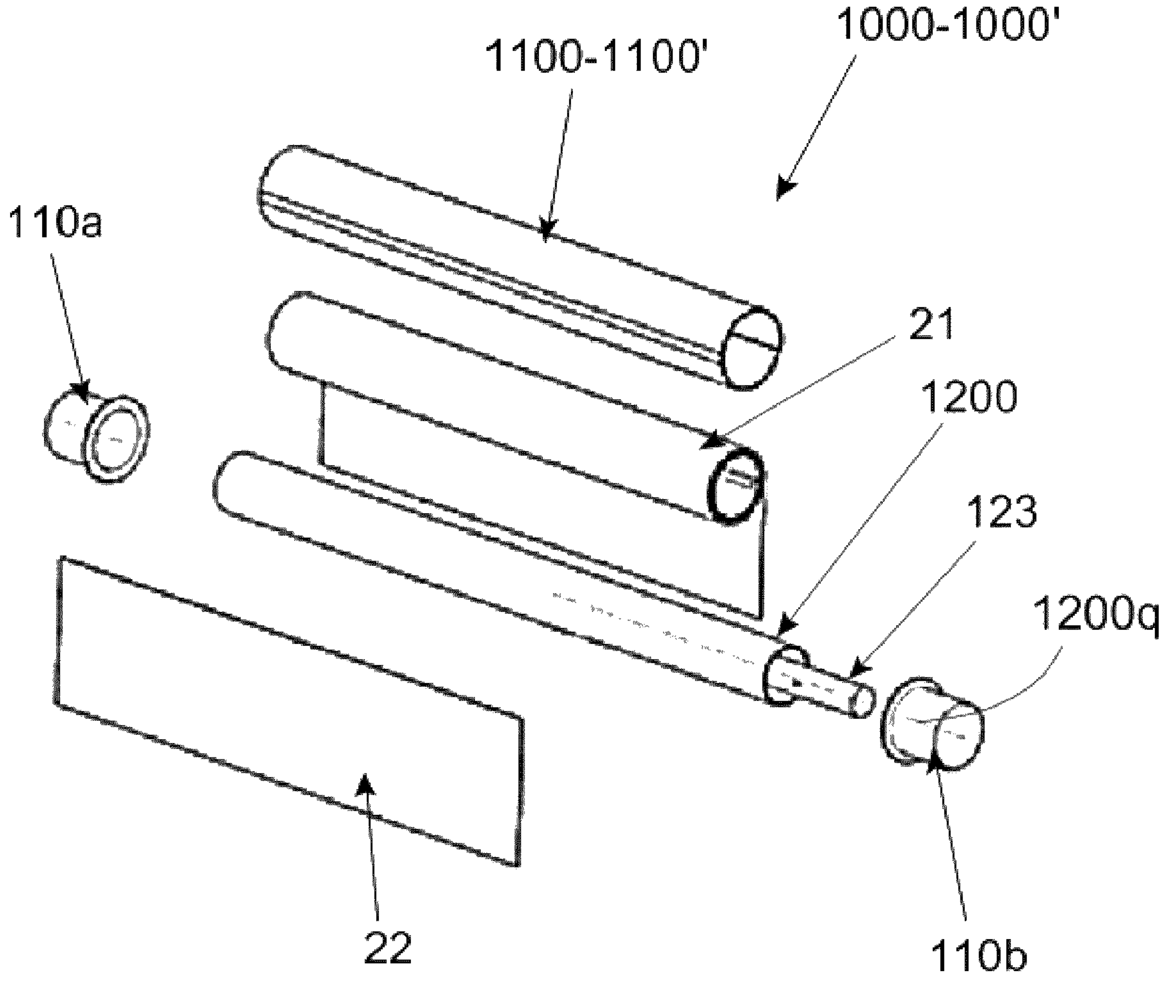

FIGS. 7*a*-7*b* and 7*d* depict another example of the retractable lighting fixture according to the disclosure. Also this example exhibits a less complex and expensive construction as presently known in the art. The example according to the disclosure in particular allows for an easy exchange of the optical layer, in FIGS. 7*a*-7*b* and 7*d* also denoted with reference numeral 22, which is essential for a poster back-lighting solution, with another optical layer 22 containing differentiation information to be displayed and illuminated. In addition, the example of the retractable lighting fixture of FIGS. 7*a* and 7*b* allows for unwinding the flexible LED layer sheet 21 from the drum 1200 and from the housing 1100 at any desirable length.

In FIGS. 7*a*-7*b* and 7*d* the other example of the retractable lighting fixture according to the disclosure is denoted with reference numeral 1000. It also comprises a housing 1100 provided with end caps 110*a*-110*b* at both its open housing ends as shown in FIG. 7*d*. Furthermore, an elongated drum 1200 which is rotatable over a length axis 1200*q* is accommodated in the housing 1100. A flexible single LED layer sheet 21 is at least partially retracted in one or more windings around the drum 1200, in a so-called retracted position.

Similar as with the first example of the disclosure, the LED layer 21 has a first LED layer edge 21*a*, which is mounted or clamped in a groove 1210 present in the outer circumference 1200*a* and extending in the elongated direction of the elongated drum 1200. The flexible single LED layer sheet 21 is movable between the retracted position and a protracted position. In the protracted position, the flexible single LED layer sheet 21 exhibits an orientation in which it has an elongated dimension longer than in the retracted position.

In particular, in the protracted position, one or more windings of the flexible LED layer sheet 21 are being unwound from the drum 1200, such that the flexible single LED layer sheet 21 protracts from an exit position 120-1' of the housing 1100, as depicted in the sectional view of FIG. 7*b*. The exit position 120-1' can be configured as an exit opening extending along the length axis of the housing 1100. In FIGS. 7*a* and 7*b*, the exit opening is configured as a slit-like opening, having an opening width (or height) more or less conformal to the thickness of the flexible LED layer sheet 21. This allows the flexible LED layer sheet 21 to exit the housing 1100, when being unwound from the drum 1100.

Similarly as the example depicted in FIGS. 3*a* and 3*b* the flexible single LED layer 21 is also provided with multiple LED elements 210, which serve to illuminate an optical layer 22, which may contain information for display. In FIGS. 7*a*-7*b* and 7*d* the optical layer 22 may be a flexible optical diffuser sheet, containing information for display and for illumination by the LED layer 21. The optical layer 22 is mounted with its free layer edge 22*a*, either through a clamping mechanism or other type of mechanism, e.g. using magnets, at a first mounting position 120-2' at the outer circumference of the housing 1100. In the protracted position of the flexible LED layer 21, the first mounting position 120-2' differs from the exit position 120-1' through which the flexible LED layer 21 protracts. As shown in FIG. 7*b*, the first mounting position 120-2' and the exit position 120-1' are located at opposite sides of the circumference of the housing 1100, e.g. at an arc length of approximately 180°. As shown in FIG. 7*b*, both layers 21-22 are spaced apart from each other at a distance d1. No additional spacer mechanism is required and with this configuration, the protracted length of the flexible LED layer 21 being unwound from the drum 1200 can be adapted to fit to the length of the optical layer 22. Herewith, the optimal illumination of the information contained on the optical layer 22 can be achieved.

In FIG. 7*a*-7*d* the elongated drum 1200-1200' has a cylindrical configuration having a diameter and a longitudinal dimension, more or less similar to the longitudinal dimension of the housing 1100.

In FIG. 7*c*—combined with FIG. 7*d*—another example is depicted, more or less similar as the example of FIGS. 5*a* and 5*b*, with one LED layer 21' and two diffusing optical layers $\mathbf{22}_1$ and $\mathbf{22}_2$. In FIG. 7*c* (and 7*d*) the example of the retractable lighting fixture according to the disclosure is denoted with reference numeral 1000'. It also comprises a housing 1100' provided with end caps 110*a*-110*b* at both its open housing ends as shown in FIG. 7*d*. Furthermore, an elongated drum 1200 which is rotatable over a length axis 1200*q* is accommodated in the housing 1100'. A flexible LED layer sheet 21' is partially retracted in one or more windings around the drum 1200, in the so-called retracted position and is mounted or clamped with its free layer edge 21*a* in the groove 1210 provided in the outer circumference of the elongated and rotatable drum 1200.

The LED layer 21' is a so-called dual sided LED layer, having two LED groups, each comprising a plurality of LEDs 210-1 and 210-2, and with each group of LEDs 210-1/210-2 being provided on either surface 21*f*1 and 21*f*2. Each layer 21*f*1-21*f*2 may optionally include electrical connections extending to each group of LEDs 210-1/210-2. In alternative embodiments, the electrical connections may be provided to the LEDs separate from the LED layer 21'.

The two groups LEDs 210-1/210-2 of the dual sided LED layer 21' are all positioned such that a majority of light output therefrom is primarily directed toward the each optical layer $\mathbf{22}_1$ and $\mathbf{22}_2$ facing either LED layer surface 21*f*1 and 21*f*2. With this example, it is possible to display and illuminate two diffusing optical layers $\mathbf{22}_1$ and $\mathbf{22}_2$ simultaneously with one dual sided LED layer 21'.

The two diffusing optical layers $\mathbf{22}_1$ and $\mathbf{22}_2$ may both contain different information to be displayed and illuminated simultaneously by the LED layer 21'. They are both mounted with their respective free, first optical layer edge 22*a*1 and 22*a*2 are different first and second mounting positions 120-2' and 120-3', respectively. Both first and second mounting positions 120-2' and 120-3' are positioned at the outer circumference of the housing 1100' and differ from each other but also differ from the exit position 120-1' at which the protracted dual LED layer sheet 21' exits the housing 1100'. Thus, different gaps or spaces d1-d2 between each diffusing optical layers $\mathbf{22}_1$-$\mathbf{22}_2$ and the LED layer 21' is created and the illuminance of two optical layers $\mathbf{22}_1$ and $\mathbf{22}_2$ sandwiching the dual sided LED layer 21' can thus be optimally adapted by one dual sided LED layer 21'.

The drum 1200-1200' of both examples of FIGS. 7*a*-7*b*, 7*d* and 7*c*-7*d* can be made hollow (in part) to accommodate one or more LED drivers 123 for receiving a supply power and for driving the (dual) LED layer 21 (21') based on said received supply power.

Both examples of FIGS. 7*a*-7*b*, 7*d* and 7*c*-7*d* can also be equipped with the light shielding means 200 as shown in relation to FIG. 6, which light shielding means 200 are intended to shield light emitted by the (dual) LED layer 21-21' from exiting or leaking from the space or gap d1 and d2 (see FIGS. 7*b*-7*c*) between both the (dual) LED layer 21 (21') and the optical layers 22 ($\mathbf{22}_1$-$\mathbf{22}_2$).

In a similar manner as disclosed with reference to the examples in FIGS. 4*a*-4*c*, the optical layers 22 ($\mathbf{22}_1$-$\mathbf{22}_2$) may be provided at their free optical layer edges 22*a* (22*a*1-22*a*2) with an identification characteristic denoted with reference numeral 22*z* (see FIGS. 4*b* and 4*c*). The identification characteristic provided at the optical layer edges can be a barcode (QR-code), a punch pattern, or a RFID tag, and can identify the optical layer e.g. as to its optimal illumination settings. Similarly, sensing elements (not shown) can be provided at the housing 1100-1100', either positioned at or worked in the outer circumference of the housing 1100-1100' at the respective first and second mounting position 120-2' and 120-3'.

These sensing elements can sense the identification characteristic of the corresponding diffusing optical layer 22 (22$_1$-22$_2$) being mounted with their free layer edge 22*a* (22*a*1-22*a*2) at or near either mounting position 120-2' and 120-3'. Likewise as with the example described in relation with FIGS. 4*a* and 4*b*, the identification characteristic 22*z* define the optimal illumination settings for the associated optical layer 22 (22$_1$-22$_2$). The sensing element can control the driver 123 in response to the identification characteristic 22*z* of the diffusing optical layer being sensed. For example, with the identification characteristic 22*z* characterizing the optimal illumination settings for the associated optical layer 22 (22*i*-22$_2$), the light output of the LED layer 21 (21') can be adapted and thus optimally adapt the illuminance of the optical layer 22 (22$_1$-22$_2$) mounted to the housing 1100-1100'.

The invention claimed is:

1. A retractable lighting fixture, comprising:

an elongated drum rotatable over a length axis; and a flexible multilayer lighting sheet movable between a retracted position and a protracted position more than the retracted position, with the multilayer lighting sheet in the retracted position being at least partially retracted in one or more windings around the drum and with the multilayer lighting sheet in the protracted position being fully unwound from the drum;

the multilayer lighting sheet being composed of at least one LED layer and at least one diffusing optical layer, the at least one LED layer having a first LED layer edge mounted at a first mounting position of the drum and the at least one diffusing optical layer having a first optical layer edge mounted at a second mounting position of the drum, the first mounting position being located at an arc length from the second mounting position.

2. The retractable lighting fixture according to claim 1, wherein the arc length between the first mounting position and the second mounting position lies between 30°-330°, for example between 45°-315° and in particular between 90°-270°.

3. The retractable lighting fixture according to claim 1, wherein the drum comprises at least one further mounting position different from the first mounting position and the second mounting position.

4. The retractable lighting fixture according to claim 1, wherein the mounting positions are located at equidistant arc lengths from each other, for example at equidistant arc lengths of 90° or 120°.

5. The retractable lighting fixture according to claim 1, wherein each first, second and further mounting position are configured as a first, second and further groove respectively, each groove provided in the outer circumference of the drum and structured to accommodate one of the first LED layer edge and the first optical layer edge, respectively.

6. The retractable lighting fixture according to claim 1, wherein the multilayer lighting sheet is composed of one LED layer and two diffusing optical layers, the mounting position of the two diffusing optical layers being located at either side of the mounting position of the LED layer.

7. The retractable lighting fixture according to claim 1, further comprising at least one driver accommodated in the drum arranged for receiving a supply power and for driving the LED layer based on said received supply power.

8. The retractable lighting fixture according to claim 1, wherein the at least one diffusing optical layer is provided at the first optical layer edge with an identification characteristic and a sensing element is provided near at least one of the first, second or further mounting positions, the sensing element structured to sense the identification characteristic of the at least one diffusing optical layer, when mounted at either first, second or further mounting positions.

9. The retractable lighting fixture according to claim 8, wherein the sensing element is structured to control the at least one driver in response to the identification characteristic of the at least one diffusing optical layer being sensed.

10. The retractable lighting fixture according to claim 8, wherein the layer surfaces of the LED layer and the diffusing optical layer facing each other are structured to reflect visible light.

11. The retractable lighting fixture according to claim 8, wherein a second LED layer edge of the LED layer and a second optical layer edge of the diffusing optical layer are provided with one or more weight elements.

12. The retractable lighting fixture according to claim 8, further comprising light shielding means structured to shield light emitted by the LED layer from exiting the multilayer lighting sheet along its longitudinal side edges.

13. The retractable lighting fixture according to claim 12, wherein the light shielding means are mounted to and extend along the longitudinal side edges of the LED layer.

14. A retractable lighting fixture, comprising:

a housing;

an elongated drum rotatable over a length axis and accommodated in the housing; and a flexible LED layer sheet movable between a retracted position and a protracted position more than the retracted position, with the flexible LED layer sheet in the retracted position being at least partially retracted in one or more windings around the drum and with the flexible LED layer sheet in the protracted position being unwound from the drum and protracted via an exit position from the housing; and at least one diffusing optical layer having a first optical layer edge mounted at a first mounting position of the housing, the first mounting position being different from the exit position.

15. A retractable lighting fixture according to claim 14, wherein the exit position is configured as an exit opening extending along the length axis of the housing, in particular configured as a slit-like exit opening.

* * * * *